(12) United States Patent
Corke et al.

(10) Patent No.: US 8,091,950 B2
(45) Date of Patent: Jan. 10, 2012

(54) METHODS AND APPARATUS FOR REDUCING DRAG VIA A PLASMA ACTUATOR

(75) Inventors: Thomas C. Corke, Granger, IN (US); Richard Spivey, Fort Worth, TX (US)

(73) Assignee: University of Notre Dame Du Lac, Notre Dame, IN (US)

( * ) Notice: Subject to any disclaimer, the term of this patent is extended or adjusted under 35 U.S.C. 154(b) by 0 days.

(21) Appl. No.: 11/934,272

(22) Filed: Nov. 2, 2007

(65) Prior Publication Data

US 2008/0122252 A1 May 29, 2008

Related U.S. Application Data

(60) Provisional application No. 60/856,871, filed on Nov. 2, 2006.

(51) Int. Cl.
*B62D 35/00* (2006.01)
(52) U.S. Cl. ............. 296/180.1; 296/180.2; 296/180.4
(58) Field of Classification Search ..... 296/180.1–180.5
See application file for complete search history.

(56) References Cited

U.S. PATENT DOCUMENTS

| | | | | |
|---|---|---|---|---|
| 2,514,695 A | * | 7/1950 | Dempsey | 296/208 |
| 3,934,922 A | * | 1/1976 | MacCready et al. | 296/180.4 |
| 3,999,797 A | * | 12/1976 | Kirsch et al. | 296/180.4 |
| 4,027,836 A | | 6/1977 | Seibel | |
| 4,320,920 A | * | 3/1982 | Goudey | 296/180.4 |
| 4,457,550 A | * | 7/1984 | Gielow et al. | 296/180.4 |
| 4,688,841 A | | 8/1987 | Moore | |
| 5,345,145 A | | 9/1994 | Harafuji et al. | |
| 5,522,637 A | * | 6/1996 | Spears | 296/180.3 |
| 5,669,583 A | * | 9/1997 | Roth | 244/130 |
| 6,416,633 B1 | | 7/2002 | Spence | |
| 6,527,221 B1 | | 3/2003 | Kremeyer | |
| 6,570,333 B1 | | 5/2003 | Miller et al. | |
| 6,619,587 B1 | | 9/2003 | Chow et al. | |
| 6,796,532 B2 | | 9/2004 | Malmuth et al. | |
| 6,805,325 B1 | | 10/2004 | Malmuth et al. | |
| 6,854,788 B1 | * | 2/2005 | Graham | 296/180.4 |
| 7,121,511 B2 | | 10/2006 | Kremeyer | |
| 7,380,756 B1 | * | 6/2008 | Enloe et al. | 244/175 |
| 7,404,592 B2 | * | 7/2008 | Reiman et al. | 296/180.4 |

(Continued)

FOREIGN PATENT DOCUMENTS

GB 2186532 * 8/1987 ................. 296/180.4

(Continued)

OTHER PUBLICATIONS

Mechanism and Responses of a Single Dielectric Barrier Plasma Acuator:Geometric Effects, AIAA Journal, vol. 42, No. 3, Mar. 2004.*

(Continued)

*Primary Examiner* — Dennis Pedder
(74) *Attorney, Agent, or Firm* — Keith R. Jarosik

(57) ABSTRACT

A vehicle includes a surface over which airflow passes. A plasma actuator is configured to generate plasma above the surface, the plasma coupling a directed momentum into the air surrounding the surface to reduce separation of the airflow from the surface. A method of reducing separation of airflow from a surface of the vehicle includes generating plasma in air surrounding the surface at a position where the airflow would separate from the surface in the absence of the plasma.

21 Claims, 18 Drawing Sheets

U.S. PATENT DOCUMENTS

| | | | |
|---|---|---|---|
| 7,624,941 B1* | 12/2009 | Patel et al. | 244/3.22 |
| 2003/0102406 A1 | 6/2003 | Chow et al. | |
| 2004/0011917 A1 | 1/2004 | Saeks et al. | |
| 2004/0104358 A1 | 6/2004 | Moroz | |
| 2004/0195462 A1 | 10/2004 | Malmuth et al. | |
| 2004/0200932 A1 | 10/2004 | Moore | |
| 2005/0118350 A1 | 6/2005 | Koulik et al. | |
| 2005/0255255 A1 | 11/2005 | Kawamura et al. | |
| 2006/0102775 A1 | 5/2006 | Chow et al. | |
| 2007/0040726 A1 | 2/2007 | Kremeyer | |
| 2007/0108344 A1 | 5/2007 | Wood | |
| 2007/0176046 A1 | 8/2007 | Kremeyer | |
| 2007/0257513 A1* | 11/2007 | Schwartz | 296/180.3 |
| 2008/0067283 A1* | 3/2008 | Thomas | 244/1 N |
| 2008/0116715 A1* | 5/2008 | Steel | 296/180.1 |

FOREIGN PATENT DOCUMENTS

| | | |
|---|---|---|
| WO | 2004/039671 A1 | 5/2004 |

OTHER PUBLICATIONS

Written Opinion of the International Searching Authority in reference to PCT Application No. PCT/US07/83488, mailed May 9, 2008, 5 pages.

International Search Report in reference to PCT Application No. PCT/US07/83488, mailed May 9, 2008, 2 pages.

Barsikow et al.,"Flyover Noise Measurements on Landing Aircraft with a Microphone Array," 1998, American Institute of Aeronautics and Astronautics, Inc., 7 pages.

Li et al.,"Unsteady Simulation of a Landing-Gear Flow Field," American Institute of Aeronautics and Astronautics, Inc., 8th AIAA/CEAS Aeroacoustics Conference, Jun. 17-19, 2002, 13 pages.

Allen et al., "Effect of Freestream Turbulence on the Flow-Induced Background Noise of In-Flow Microphones," American Institute of Aeronautics and Astronautics, Inc., In 4th AIAA/CEAS Aeroacoustics Conference, 1998, 11 pages.

Huang, Junhui, "Separation Control over Low Pressure Turbine Blades Using Plasma Actuators," Ph.D. dissertation, University of Notre Dame, Apr. 2005.

International Preliminary Report on Patentability, corresponding to International Application No. PCT/US2007/083488, mailed May 14, 2009, issued May 5, 2009, 6 pages.

Official Communication for U.S. Appl. No. 11/686,153, mailed Apr. 27, 2009, 12 pages.

Official Communication for U.S. Appl. No. 11/686,153, mailed Aug. 11, 2008, 14 pages.

Official Communication for U.S. Appl. No. 11/686,153, mailed Jan. 14, 2008, 13 pages.

Barry Lazos; "Surface Topology on the Wheels of a Generic Four-Wheel Landing Gear", AIAA Journal, vol. 40, No. 12, pp. 2402-2411, Dec. 2002 (exact date not given).

David P. Lockard, et al; "AIAA 2004-2887 Aeroacoustic Analysis of a Simplified Landing Gear", 10$^{th}$ AIAA/CEAS Aeroacoustics Conference May 10-13, 2004, Manchester, UK, pp. 1-11.

J.E. Ffowcs Williams, et al; "Sound Generation by Turbulence and Surfaces in Arbitrary Motion", Philosophical Transactions for the Royal Society of London. Series A, Mathematical and Physical Sciences, vol. 264, Issue 1151, pp. 321-342, May 8, 1969.

Alexander Fridman, et al; "Plasma Physics and Engineering", Taylor & Francis, New York, pp. 573-579, 2004 (exact date not given).

C.L. Enloe, et al; "Mechanisms and Responses of a Single Dielectric Barrier Plasma Actuator: Geometric Effects" AIAA Journal, vol. 42, No. 3, pp. 595-604, Mar. 2004 (no exact date given).

C.L. Enloe, et al; "Mechanisms and Responses of a Single Dielectric Barrier Plasma Actuator: Plasma Morphology", AIAA Journal, vol. 42, No. 3, pp. 589-594, Mar. 2004 (no exact date given).

Martiqua L. Post; "Phased Plasma Actuators for Unsteady Flow Control", A Thesis M.S. Thesis University of Notre Dame Department of Aerospace and Mechanical Engineering, Jul. 2001, 7 pages.

D.A. Hammond, et al; "Global dynamics of symmetric and asymmetric wakes", J. Fluid Mech., vol. 331, pp. 231-260, 1997 (exact date not given).

K. Hannemann, et al; "Numerical simulation of the absolutely and convectively unstable wake", J. Fluid Mech., vol. 199, pp. 55-88, 1989 (exact date not given).

S.D. Olson; "Slat Tonal Noise Mechanisms in a Two-Dimensional Multi-Element Airfoil Configuration", Ph.D. Dissertation Submitted to the Graduate School of the University of Notre Dame, 7 pages Apr. 2003 (exact date not given).

Martiqua L. Post, et al; "Separation Control on High Angle of Attack Airfoil Using Plasma Actuators", AIAA Journal, vol. 42, No. 11, pp. 2177-2184, Nov. 2004 (exact date not given).

Vadim Stepaniuk, et al; "Sound Attenuation by Glow Discharge Plasma", AIAA Journal, vol. 42, No. 3, pp. 545-550, Mar. 2004 (exact date not given).

Junhui Huang, et al; "Unsteady Plasma Actuators for Separation Control of Low-Pressure Turbine Blades", AIAA Journal, vol. 44, No. 7, pp. 1477-1487, Jul. 2006 (exact date not given).

Junhui Huang, et al; "Plasma Actuators for Separation Control of Low-Pressure Turbine Blades", AIAA Journal, vol. 44, No. 1, pp. 51-57, Jan. 2006, (exact date not given).

Christopher S. Allen, et al; "Current Background Noise Sources and Levels in the NASA Ames 40- by 80-Foot Wind Tunnel- A Status Report", NASA Ames Research Center, Moffett Field, California, 3 pages, Nov. 2003 (exact date not given).

USPTO Office Action mailed Dec. 10, 2009 for U.S. Appl. No. 11/686,153.

* cited by examiner

Asymmetric Steady Actuator (Triangle Waveform, 5kH)

No Flow Control - Large Velocity Fluctuations Airflow Around a Normal 5" dia.Cylinder

With Flow Control - Minimum Fluctuations Airflow with Two PFC Actuators

METHODS AND APPARATUS FOR REDUCING DRAG VIA A PLASMA ACTUATOR

CROSS REFERENCE TO RELATED APPLICATION

This application is a non-provisional application claiming priority from U.S. Provisional Application Ser. No. 60/856,871, filed Nov. 2, 2006, entitled "Truck Tractor and Trailer Aerodynamic Drag Reduction Using Single Dielectric Barrier Discharge (SDBD) Plasma Actuators" and incorporated herein by reference in its entirety.

FIELD OF THE DISCLOSURE

The present disclosure relates generally to drag reduction, and more particularly, to methods and apparatus for reducing drag via a plasma actuator.

BACKGROUND OF RELATED ART

Trucks, such as for example, class-8 heavy duty trucks typically use significant amounts of fuel to move cargo across the nation. In most instances, very little attention has been paid to the major drag-producing design with the exception of a passive fairing placed over the tractor top and/or side to help close the gap between tractor and trailer. Separated flow typically exists over many of the surfaces to include the tractor-trailer gap, the rear end of the trailer and all along the under-carriage of the rig. It is known that overcoming the effects of drag oftentimes can require as much as two-thirds of the engine's power at a cruise speed of 70 miles per hour. Accordingly, class-8 truck gas mileage has not changed much in 15 years, and it is typically still between 5.5 and 6.5 miles per gallon. While some improvement has been made in efficiency, most of the gains have been negated by increases in cruise speed and higher gross weight limits. The use of an active flow control by plasma actuators can reduce the areas of separated flow which can make significant gains in rig efficiency, lowering the power and fuel consumption and improving the environmental emissions.

Previous efforts to reduce the drag of these rigs have made some improvements, but so far have been slow to gain acceptance into the fleets because they interfere with the utility of the vehicle, require extensive power, are expensive modifications, show small improvements in fuel consumption and/or are not structurally sound enough to handle the day-to-day rough conditions that these vehicles experience. Some improvements have included fairings below the trailer body between the wheels, extension of the aft end of the trailer, and high speed injection of air into the flow.

Plasma actuators have no moving parts, require very little power, can be incorporated into fairings and basic tractor and trailer structure, and show promise to greatly reduce the power and fuel consumption. They can be painted over and not even be seen by the casual observer.

Plasma flow actuators provide a "body force" to the flow as the air passes over the surface. This "body force" accelerates the air, stabilizing the boundary layer and causing the air to remain attached to the surface even around tight radii to reduce or eliminate separated flow, a source of drag. By placing these actuators on the surface just before where the flow would ordinarily separate, the flow will remain attached which reduces drag.

In one example, plasma actuators may be placed on fairings over the aft doors of the trailer to coax the flow around the corners, greatly reducing the turbulence and vortices behind these rigs. In another example, fairings may be incorporated into the doors for new trailers, and in yet another example, the same concept may be applied to the aft part of the tractor to cause the flow to stay attached behind the tractor. In still other examples, the forward part of the trailer may have actuators on its leading corners to keep the flow attached along the sides and top. In each of these examples, the gap-drag may thus be minimized leading to additional fuel savings.

In another example, plasma actuators may be applied to the under-carriage of a vehicle to contain the flow and maintain attachment to assist in drag reduction. Still further, in each of the disclosed examples, the actuators may be turned off whenever the driver applies the brakes, to allow the drag to increase, thereby slowing the vehicle and reducing the braking needed.

DETAILED DESCRIPTION

The following description of various examples is not intended to limit the scope of the invention to the precise form or forms detailed herein. Instead, the following description is intended to be illustrative of the principles of the disclosure so that others may follow its teachings.

Figure 1:
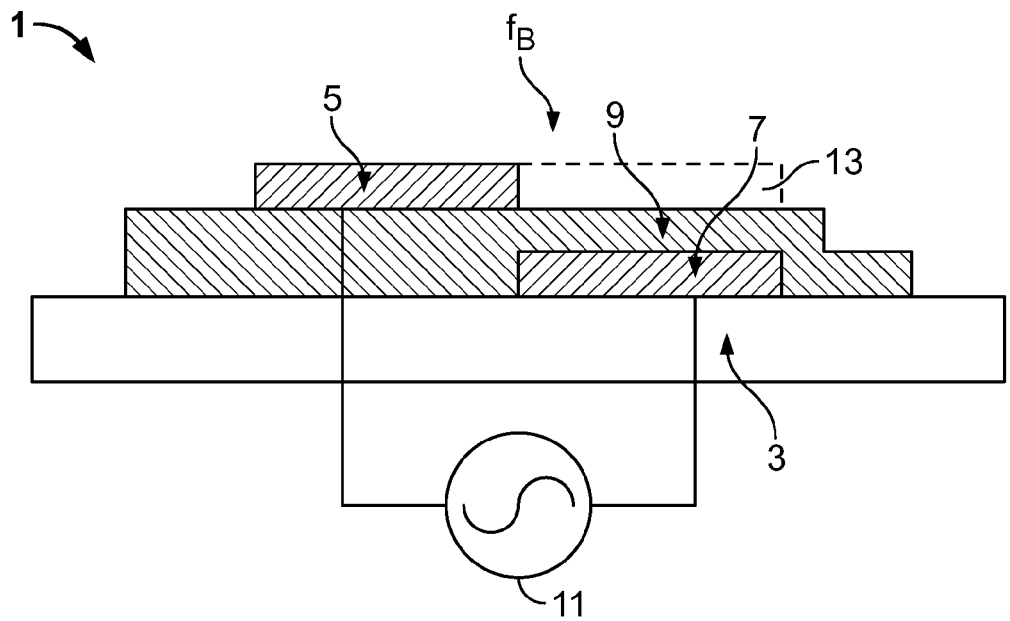
FIG. 1 is a cross-sectional schematic illustration of an example single dielectric barrier discharge plasma actuator for use in reducing drag.

Referring to FIG. 1, an example single-dielectric barrier discharge (SDBD) plasma actuator 1 is attached to a surface 3, such as a fairing and/or a vehicle as will be described below. The actuator 1 may be attached to the surface such as, in particular, any region in which airflow separates from the surface 3. The example plasma actuator 1 includes an exposed electrode 5, a covered, insulated electrode 7 and a dielectric barrier material 9. The exposed electrode 5 may be at least partially covered, while the insulated electrode 7 may be at least partially exposed. In this example, an alternating current (AC) voltage source 11 is electrically coupled to the electrodes 5 and 7.

Although the actuator 1 is shown in FIG. 1 as extending from the surface 3, it will be appreciated that the actuator 1 may be provided in a recess in the surface 3 so as to be partially or completely flush with the surface 3. The electrodes 5 and 7 may be formed of any suitable conductive material, such as for example, copper foil. Similarly, the dielectric 9 may be formed of a suitable electrically insulating material, such as for example, a polyimide tape, such as KAPTON®. In the example plasma actuator 1, the desired thickness of the dielectric 9 may be designed to be dependent on the maximum voltage that will be applied to the plasma actuator 1. Polyimide tape is thin and flexible, but may degrade over time due to ozone generation in plasma. The dielectric 9 may also be a ceramic, such as MACOR®, which is typically machineable and durable. A dielectric formed of ceramic would typically need to be thicker than a dielectric formed of polyimide tape and be machined to its final shape. The dielectric 9 may also be a thermoplastic, such as for example, a semi-crystalline thermoplastic such as PEEK® film, which is thin and flexible and not affected by ozone. A thermoplastic film may also resist erosion caused by water.

In operation, the application of high voltage by the voltage source 11 tends to cause air to ionize and create plasma. When the AC voltage is applied, a plasma discharge appears on the surface of the dielectric 9 above the covered electrode 7 and a directed momentum is coupled into the surrounding air. The momentum coupling alters the airflow over the actuator 1. The plasma in the presence of an electric field E gradient, results in a body force vector $f_B$ that acts on the airflow, as shown in FIG. 1. The body force is a body force per volume of plasma that varies in time and space during the AC voltage cycle. The body force vector $f_B$ is defined by: $f_B = \rho_C E$ where $\rho_c$ is the charge density of the plasma and E is the electric field gradient. Using the Boltzmann relationship, and substituting for $\rho_c$, the body force vector can be rewritten as $f_B = (\in_o / \lambda_D^2) \phi E$, where $\in_o$ is the permittivity of the free space, $\lambda_D$ is the Debye length (i.e. the characteristic length for electrostatic shielding in plasma), and $\phi$ is the electric potential. From this equation, it is clear that the body force from the plasma actuator 1 decreases with decreasing plasma density, i.e. increasing Debye length.

Referring still to FIG. 1, in the example actuator 1, the edges of the exposed electrode 5 and the covered electrode 7 are overlapped by a small amount in order to produce a more uniform plasma in the full spanwise direction of the surface 3. If no overlap is provided, the air gap between the electrodes 5 and 7 tends to break down at the applied voltage before the dielectric 9. At atmospheric pressure, almost any available dielectric material has a dielectric strength and breakdown voltage superior to air, and therefore air gaps typically are avoided in the design of the plasma actuator. If an air gap is present, the result is oftentimes a spanwise non-uniformity in the plasma, which tends to reduce the effectiveness of the plasma actuator.

The example plasma actuator 1 of FIG. 1 is a single dielectric barrier discharge (SDBD) plasma actuator. The example SDBD plasma actuator is stable at atmospheric pressure because it is self limiting due to charge accumulation on the surface of the dielectric 9. In other words, the behavior of the plasma actuator 1 is primarily determined by the buildup of charge on the covered, insulated electrode 7. When the AC voltage source 11 applies an AC voltage, a plasma discharge appears on the surface of the dielectric 9 above the covered, insulated electrode 7 and directed momentum, defined by the body force vector $f_B$, is coupled to the surrounding air. The body force vector $f_B$ may be tailored for a given application through the orientation and design of the geometry of the electrodes 5 and 7. For example, the electrodes 5 and 7 may be designed to produce upstream or downstream oriented wall jets or streamwise vortices.

Although the generated plasma is composed of charged particles, it is net neutral because it is created by the ionization of neutral air and an equal number of negative electrons and positive ions exist in the plasma. The charged particles respond to the external electric field and the electrons move to the positive electrode and the positive ions move to the negative electrode. This movement results in an imbalance of charges on the edges of the plasma that sets up an electric field in the plasma that is opposite to the externally applied electric field. The imbalance of charges on the edges of the plasma is due to the thermal motion of the charged particles in the plasma. The rearrangement of the charged particles continues until the net electric field in the plasma is neutralized.

Figure 2A:
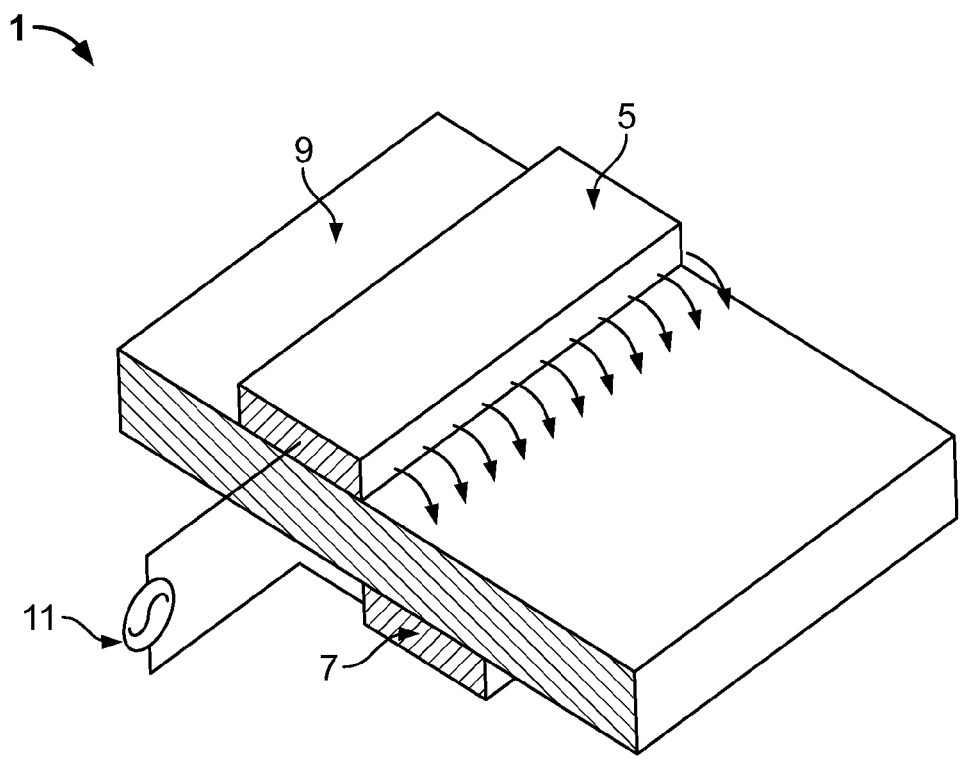
FIGS. 2a and 2b are schematic illustrations of the example single dielectric barrier discharge plasma actuator of FIG. 1 during half-cycles of an applied voltage waveform.
Figure 2B:
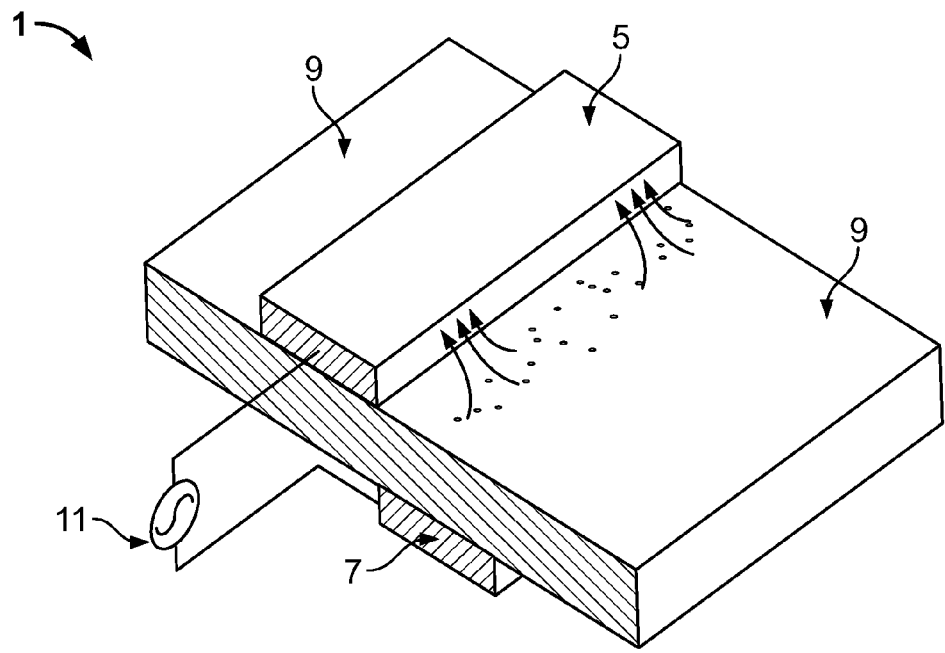

Referring to FIGS. 2a and 2b, a plasma is formed as a result of a series of discharges as electrons are transferred onto and off the surface of the dielectric 9. As shown in FIG. 2a, when the applied voltage is negative, electrons move from the exposed electrode 5 to the dielectric 9. As shown in FIG. 2b, when the applied voltage is positive, electrons move from the dielectric 9 to the exposed electrode 5. The buildup of charge on the surface of the dielectric 9 is the reason that the discharge is self limiting and does not collapse into a constricted arc. Based on the energies, the electrons penetrate at most a few monolayers of the dielectric 9. Due to the low conductivity of the dielectric 9, the electrons generally remain at the location where they are deposited. The portion of the dielectric 9 that collects and includes the immobile electrons acts as a virtual electrode 13, as shown in FIG. 1, in addition to the two electrodes 5 and 7 of the plasma actuator 1.

FIG. 2a represents the half cycle of the discharge for which the exposed electrode 5 is more negative than the surface of the dielectric 9 and the covered, insulated electrode 7. The exposed electrode 5 thus acts as a cathode in the discharge. If the applied voltage is high enough, the exposed electrode 5 can emit electrons. Because the discharge terminates on the surface of the dielectric 9, the buildup of the charge on the surface of the dielectric 9 opposes the voltage applied by the source 11, and the discharge shuts itself off unless the magnitude of the applied voltage is continually increased. The behavior of the discharge is similar on the opposite half cycle shown in FIG. 2b and a positive slope in the applied voltage is necessary to maintain the discharge. In the opposite half cycle shown in FIG. 2b, the surface of the dielectric 9 acts as a cathode. During the half cycle shown in FIG. 2b, the charge available to the discharge is limited to the charge deposited during the half cycle shown in FIG. 2a.

Figure 2C:
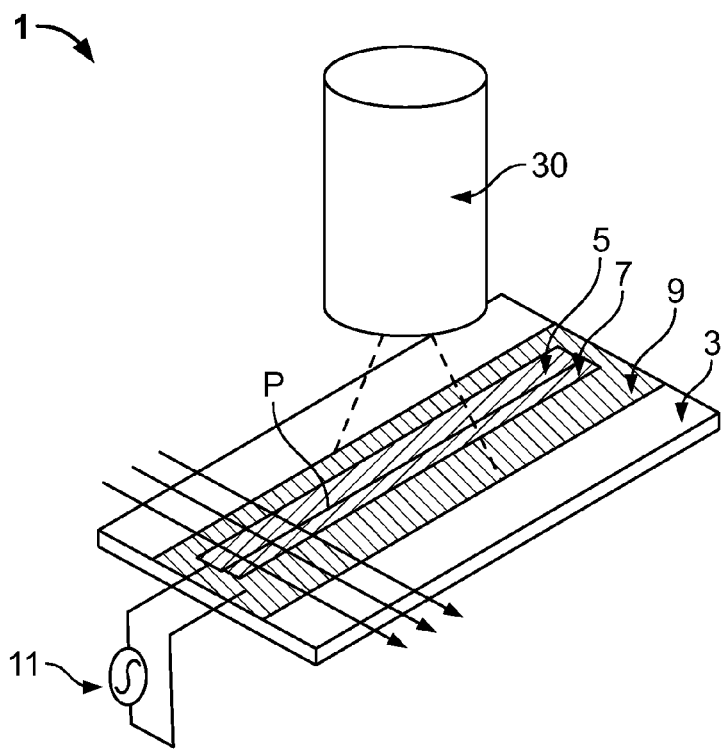
FIG. 2c is a schematic illustration of a photomultiplier tube arrangement used to measure light emissions from an example plasma actuator.
Figure 2D:
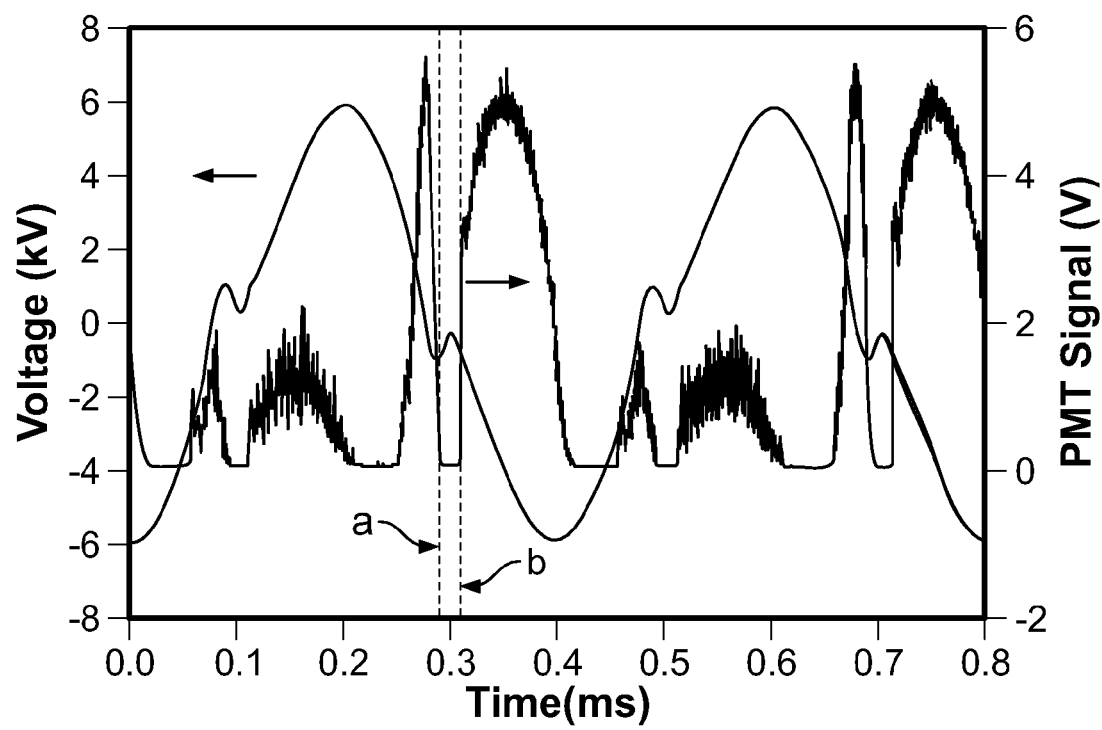
FIG. 2d is an illustration of an example light emission from an example plasma actuator as a function of the applied voltage.

Referring to FIG. 2c, a photomultiplier tube (PMT) 30 may be used to observe the bulk plasma with high time resolution. The light emissions observed by the PMT 30 are proportional to the dissipated current in the generated plasma. For the results shown in FIGS. 2d and 2e, the PMT 30 was arranged to observe approximately one third of the length of the plasma actuator 1. FIG. 2d shows two cycles of a plasma discharge that turns on and off during each cycle of the applied voltage. At a point "a" in the figure, due to some impedance mismatch in the driving circuit that applies the AC voltage, there is a momentary reversal in the slope of the applied waveform. Because the applied voltage is no longer becoming more negative, the discharge shuts off. At a point "b" in the figure, the applied voltage again resumes a negative course and the discharge reignites and stays ignited until the slope of the voltage waveform goes to zero, at approximately t=0.4 ms in this example.

Figure 2E:
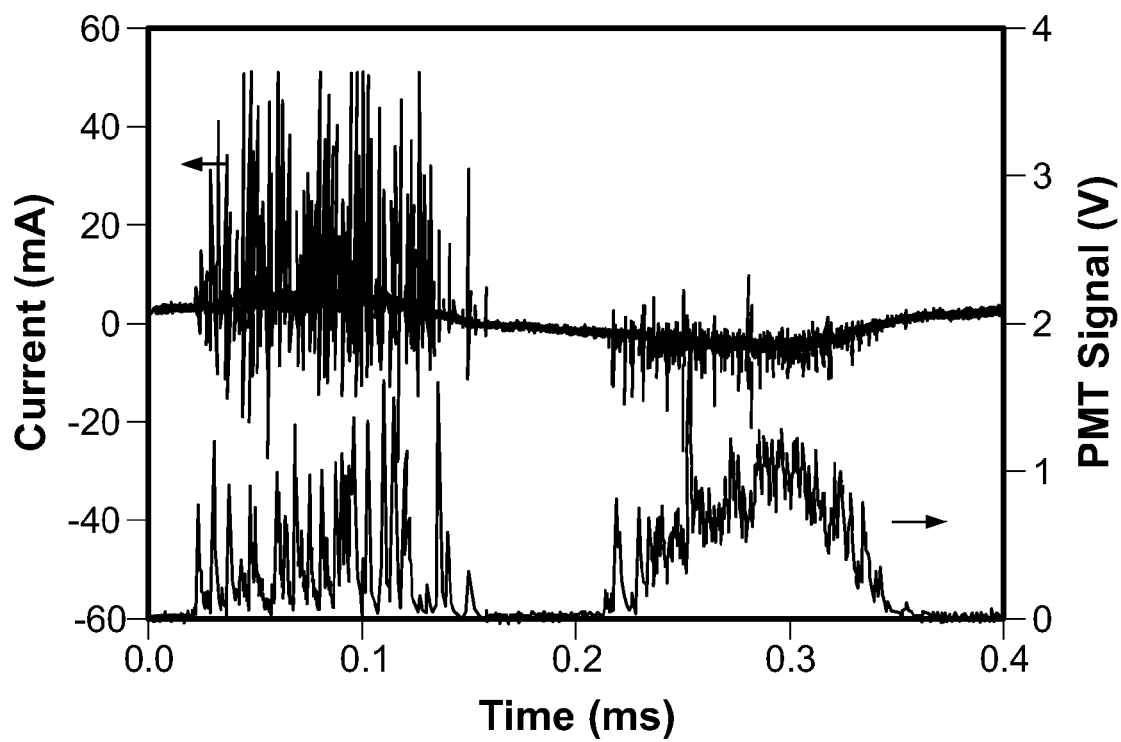
FIG. 2e is an illustration of an example light emission from an example plasma actuator as a function of the applied current.
Figure 2F:
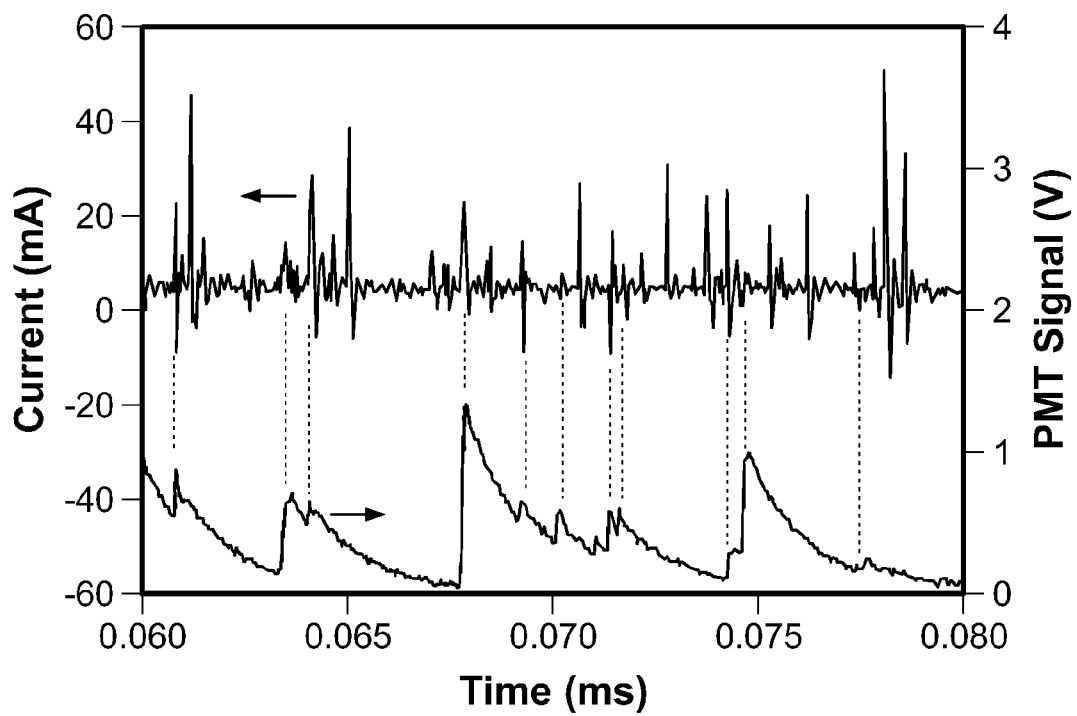
FIG. 2f is an illustration of an example light emission from the plasma actuator of FIG. 2e.

FIG. 2e shows one discharge cycle of the plasma actuator 1 with a sinusoidal applied voltage waveform. As shown in the figure, the discharge is more irregular on the positive-going half cycle than the negative-going half cycle. FIG. 2f shows same data as FIG. 2e but on a finer timescale. As shown in FIG. 2f, each pulse of light observed by the PMT 30 corresponds to a pulse in the current signal. However, not every current pulse corresponds to a light pulse. This is due to the fact that the PMT 30 only observes approximately one third of the plasma actuator 1, while the current monitor measures the current during the entire discharge, thus there are discharges that do not occur in the PMT 30's field of view. When the voltage on the exposed electrode 5 is negative-going, the discharge is relatively uniform across the width of the plasma actuator 1. When the voltage is positive-going, the discharge is irregular, or "patchy." The asymmetry in the discharge affects the efficiency of the momentum coupling to the flow, as described below.

Figure 2G:
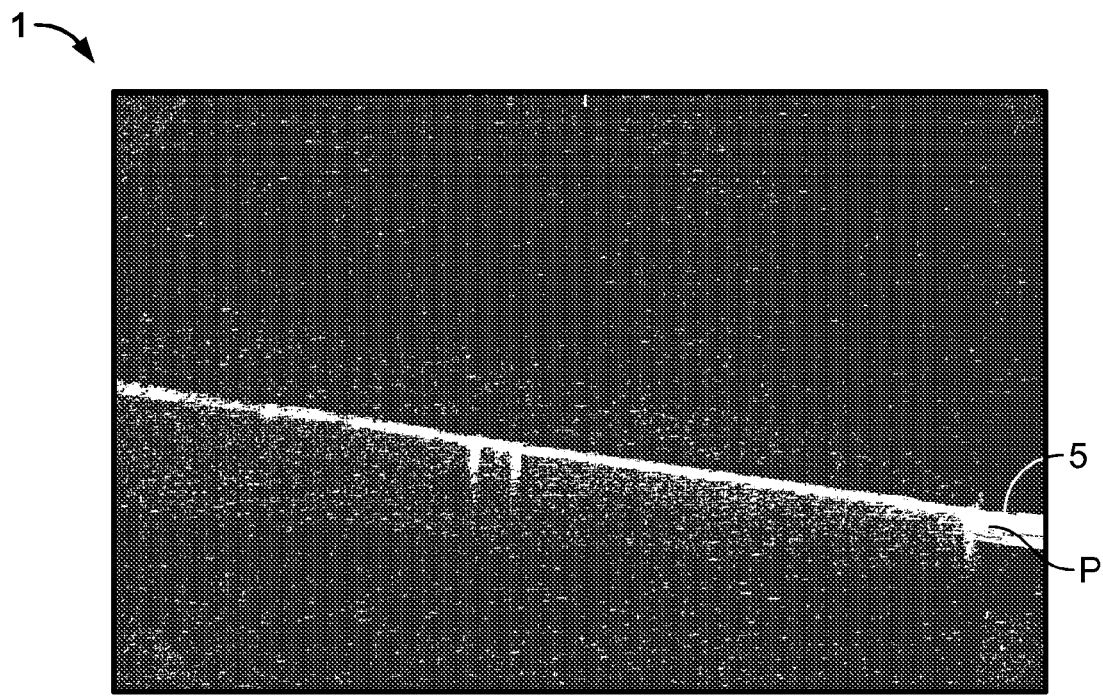
FIG. 2g is a photograph of the plasma generated by an example plasma actuator.
Figure 2H:
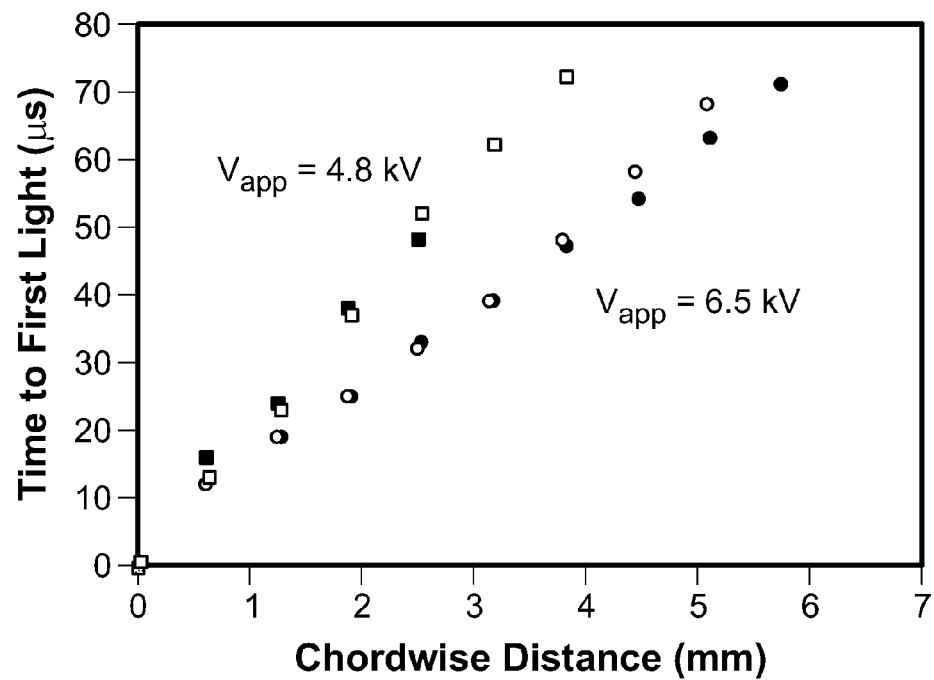
FIG. 2h is an illustration of the time to first light of the plasma as a function of the lateral (chordwise) distance of an example plasma actuator.
Figure 2I:
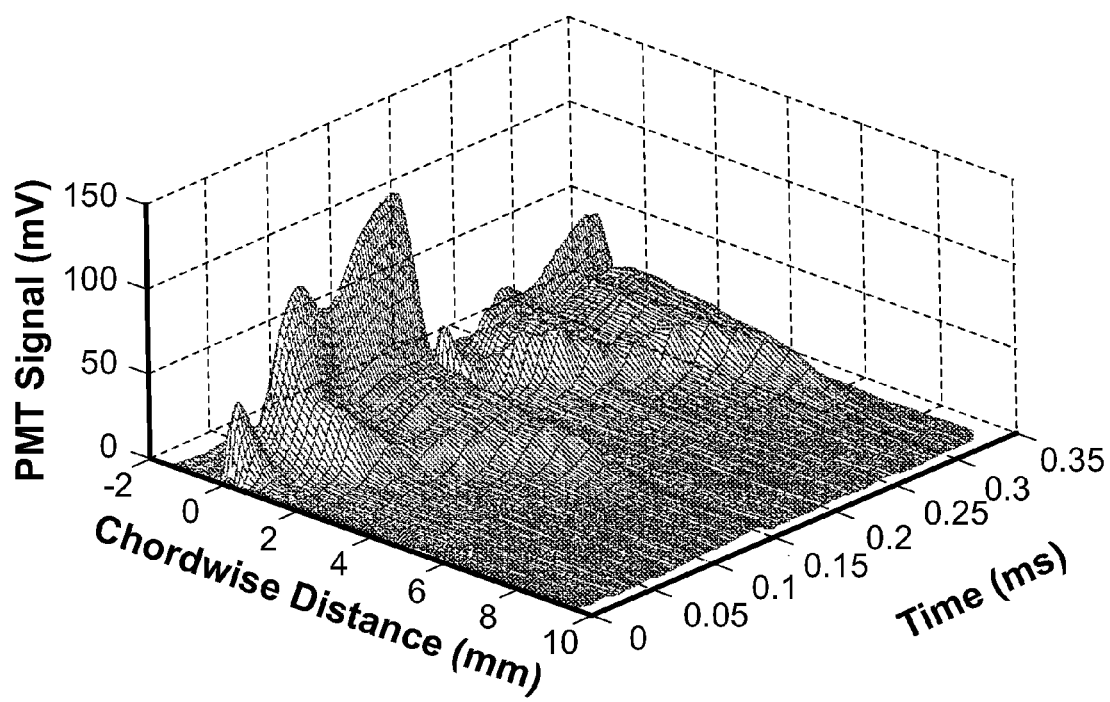
FIG. 2i is a surface plot of the light emission of an example plasma actuator.

FIG. 2g shows an "open shutter" view of the plasma P (i.e. the shutter speed is longer than the period of the applied voltage waveform) generated by the example plasma actuator 1. FIG. 2g appears to show a plasma density gradient because the plasma nearest the edge of the exposed electrode 5 is brightest. However FIG. 2h shows the relative time to first light as a function of lateral position of an aperture interposed between the plasma and the PMT 30. As shown in the FIG. 2h, the plasma grows in the lateral (i.e. chordwise) direction at a constant rate. The plasma near the edge of the exposed electrode 5 thus appears brighter in FIG. 2g due to its having emitted for a greater fraction of the discharge cycle, not because of a higher plasma density. It is also shown in the FIG. 2h that the higher the applied voltage, the faster the plasma discharge spreads along the surface of the dielectric 7. The propagation speed of the plasma discharge is also essentially the same for both the negative-going and positive-going half cycles for a given voltage. For both half-cycles, the discharge ignites at the edge of the exposed dielectric 7 and propagates along the surface of the dielectric 7. Although there is a difference in the transverse (spanwise) structure of the plasma between half-cycles of the discharge, as shown in FIGS. 2e and 2f, the lateral (chordwise) extent and development of the plasma is essentially the same. A surface plot of the light emission of the plasma as seen by PMT 30 is shown in FIG. 2i.

Figure 3:
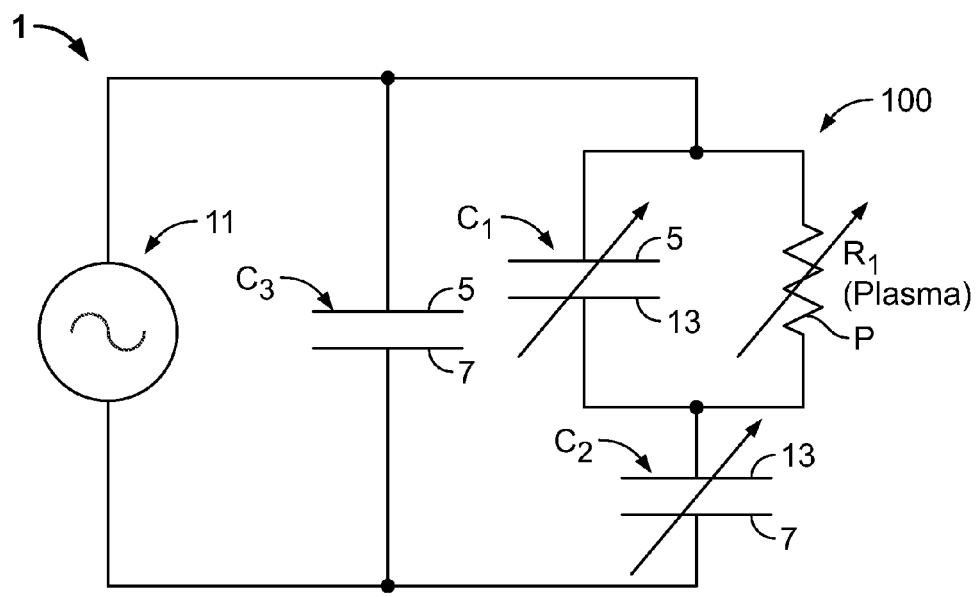
FIG. 3 is circuit model of the example plasma actuator of FIG. 1.

Referring to FIG. 3, the plasma actuator 1 may also be modeled as an electric circuit 100. In the example circuit 100 the capacitor C1 represents the capacitance between the exposed electrode 5 and the virtual electrode 13. The capacitor C2 represents the capacitance between the virtual electrode 13 and the covered insulated electrode 7. Because the electrodes 5 and 7 are offset, a capacitance C3 is included because some field lines connect the electrodes 5 and 7 directly. The capacitance C3 provides a parallel path for additional displacement current in the circuit, but does not affect the discharge.

Because the chordwise extent of the plasma changes during the discharge, the capacitances C1 and C2 are represented as variable. Therefore, for purposes of this model, the values of C1 and C2 are represented as variable. Also, for purposes of this model, the values of C1 and C2 may be considered as average capacitances that depend on the amplitude of the applied AC voltage 11. The plasma is represented as a resistor R1 because it is the single dissipative element in the circuit. The plasma does not exist during the entire discharge and is thus represented as a variable value as well. When the absolute value of the potential difference falls below another threshold, the discharge quenches and the resistance R1 returns to its open circuit value. The application of the AC voltage 11 to the plasma actuator 1 allows the discharge to be sustained.

Figure 4A:
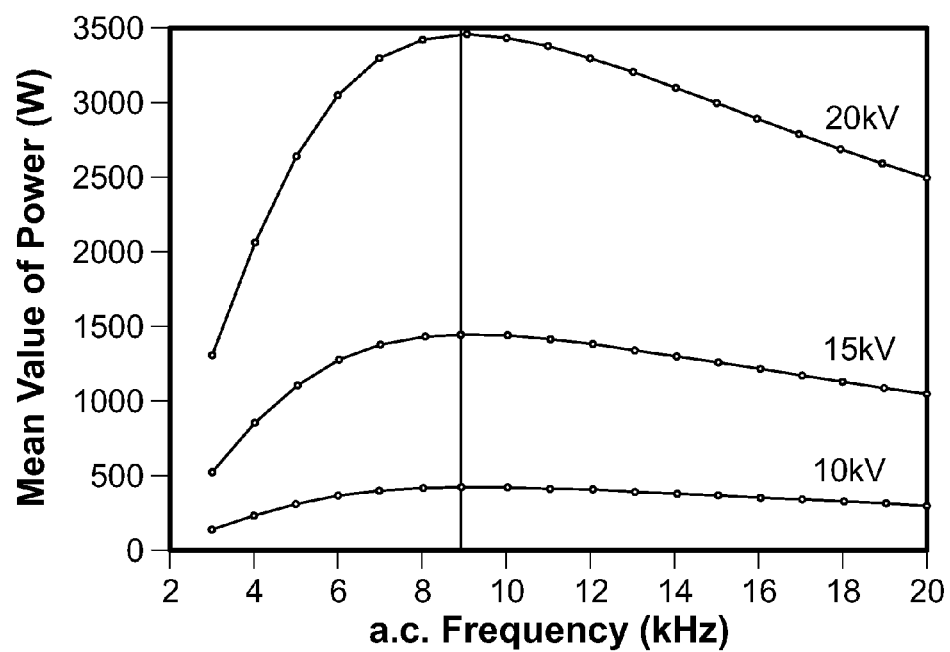
FIGS. 4a and 4b are schematic depictions of frequency and amplitude optimization, respectively, of an example plasma actuator.
Figure 4B:
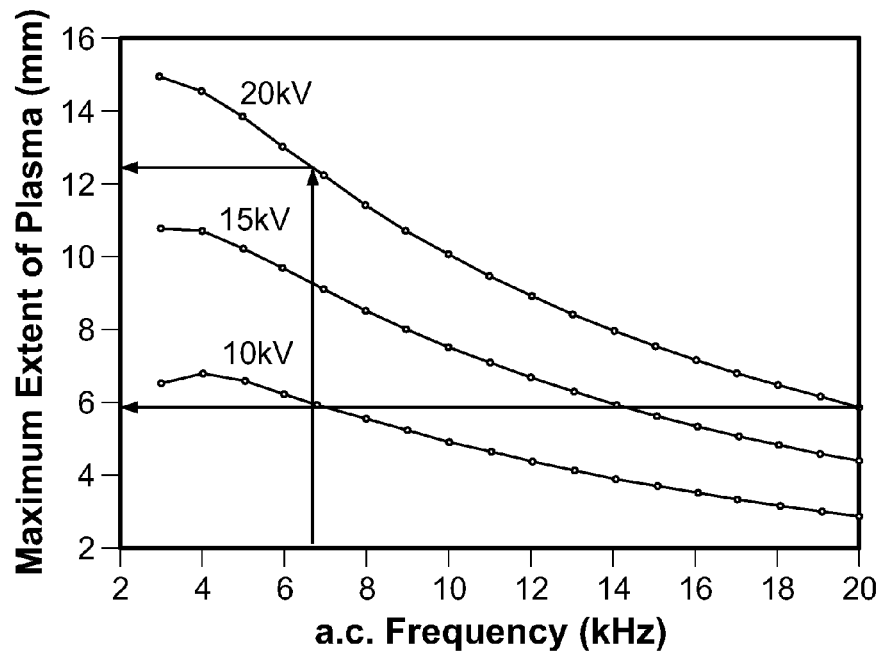

The power dissipated by the plasma actuator 1 and the maximum extent of the plasma discharge as a function of the frequency of the applied AC voltage are shown in FIGS. 4a and 4b, respectively. As modeled by the circuit of FIG. 3, FIGS. 4a and 4b indicate that an optimum frequency exists for peak plasma power. The existence of the optimum frequency allows the width of the covered, insulated electrode 7 to be reduced. For example, as shown in FIGS. 4a and 4b, a width of 12 mm is required for a 20 kV voltage applied at 6 kHz. However, for the same 20 kV voltage, the same plasma power discharge may be obtained if the voltage is applied to a 6 mm electrode at 20 kHz. This allows the width of the covered, insulated electrode 7 to be reduced 50%, i.e. from 12 mm to 6 mm. Reducing the width of the covered, insulated electrode 7 allows more dense packing of the actuators to the surface 3 in an array, while using plasma actuators in an array provides a linear additive effect. However, the size of each plasma actuator is typically directly related to the volume of the plasma it produces, thus the chordwise length of the plasma actuator cannot exceed the maximum extent of the plasma for actuators used in an array to prevent any overlapping effects.

Figure 5A:
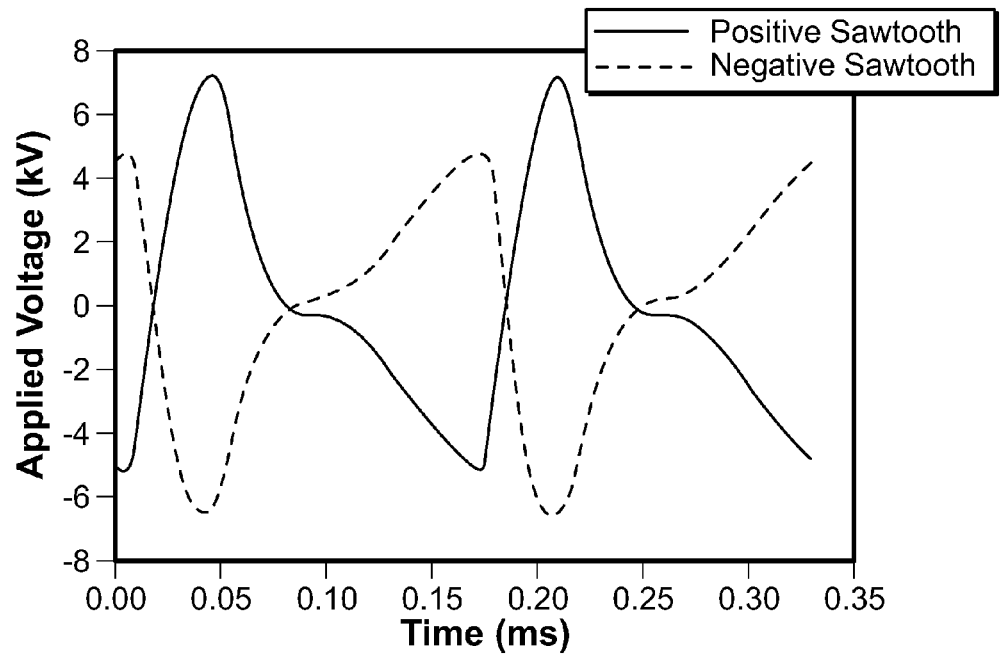
FIG. 5a is an illustration of positive and negative sawtooth voltage waveforms applied to an example plasma actuator.
Figure 5B:
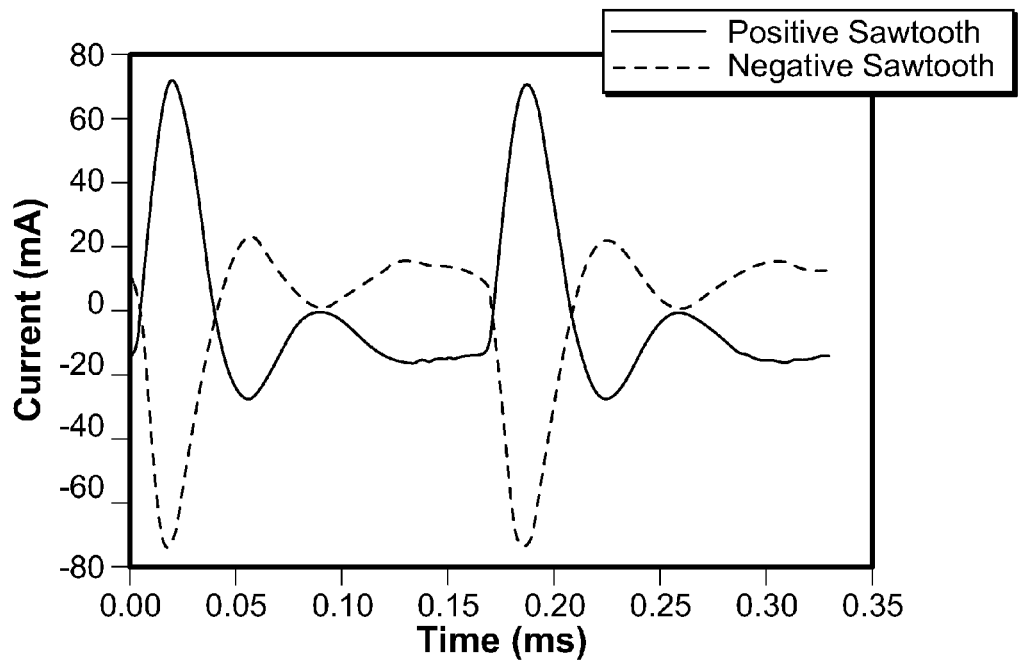
FIG. 5b is an illustration of positive and negative sawtooth current waveforms, corresponding to the positive and negative sawtooth voltage waveforms of FIG. 5a, applied to an example plasma actuator.

As discussed above, the spatial structure of the plasma discharge is asymmetric. To determine the effects of this asymmetry, two different asymmetric voltage waveforms, which are mirror images of each other, may be applied to the plasma actuator 1. In one instance, a positive sawtooth waveform, having a large positive slope and a smaller negative slope, was applied to the plasma actuator 1. In another instance, a negative sawtooth waveform, having a large negative slope and a smaller positive slope, was applied to the plasma actuator 1. The positive and negative sawtooth voltage and current waveforms are shown in FIGS. 5a and 5b, respectively.

Figure 5C:
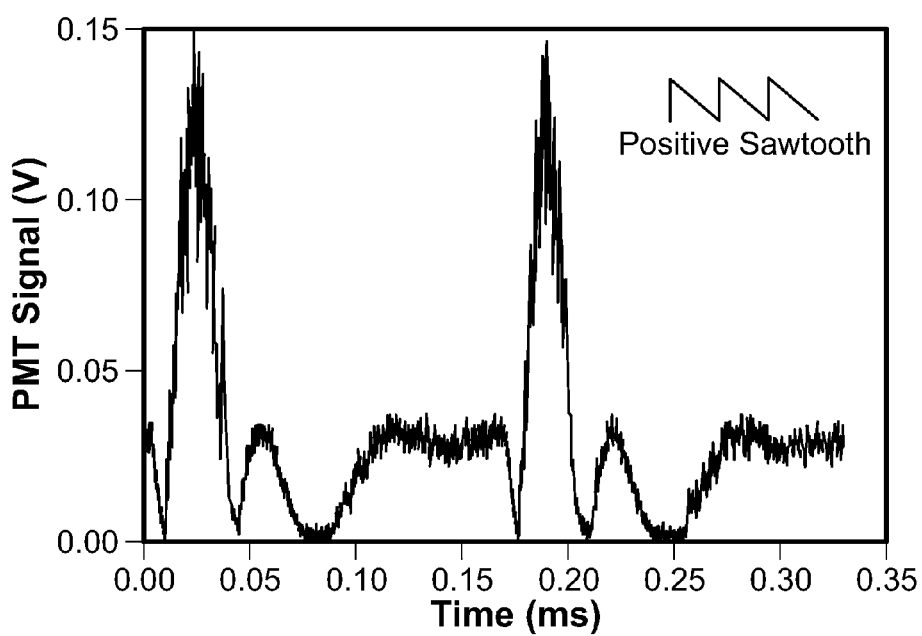
FIG. 5c is an illustration of the light emission from an example plasma actuator for the example of the applied positive sawtooth voltage waveform of FIG. 5A.
Figure 5D:
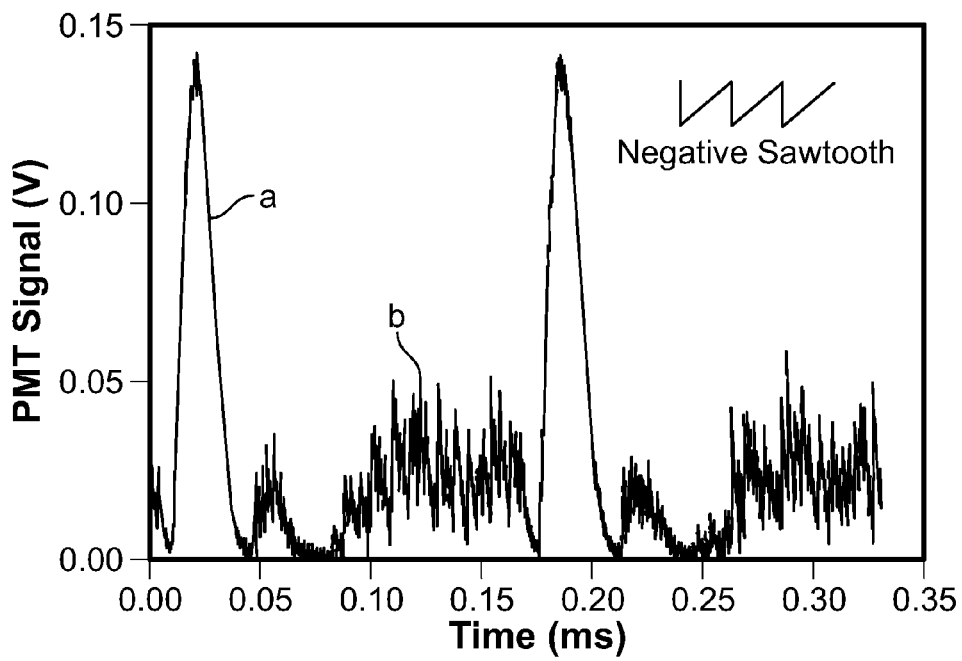
FIG. 5d is an illustration of the light emission from an example plasma actuator for the example of the applied negative sawtooth voltage waveform of FIG. 5A.

FIGS. 5c and 5d illustrate the light emission from the plasma in the case of the positive sawtooth waveform and the negative sawtooth waveform, respectively. Although the light emissions would appear to have generally the same shape, it is clear from the figures that the negative going portion of the waveform, as shown by point (b) in FIG. 5c and by point (a) in FIG. 5d, produces the more uniform discharge. This is consistent with the asymmetry of the plasma discharge discussed above. The positive-going portions of the waveform, as shown by point (a) in FIG. 5c and by point (b) in FIG. 5d, produces an irregular discharge, as discussed above with respect to FIG. 2d.

Figure 5E:
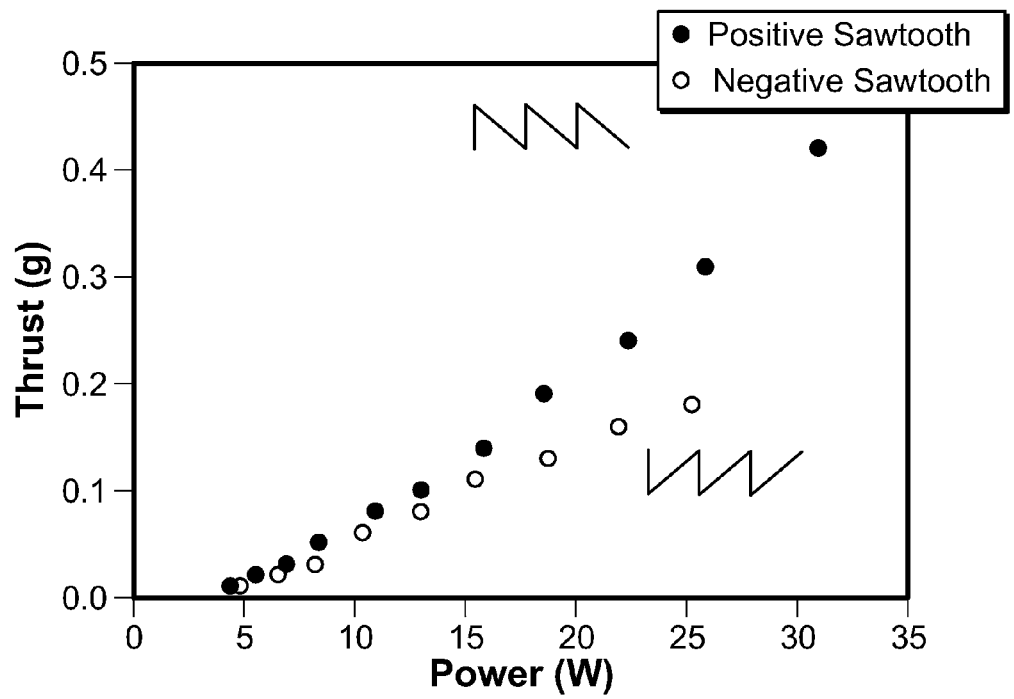
FIG. 5e is an illustration of the thrust versus dissipated power of an example plasma actuator for both the applied positive and negative sawtooth voltage waveforms.

The plasma actuator's effectiveness may be determined by measuring the thrust it produces in initially still air. To measure the thrust, the actuator 1 may be mounted on a lever arm (not shown) and the thrust it produces measured on a mass balance at the opposite end of the lever arm. FIG. 5e shows an example plot of thrust versus dissipated power for the positive and negative sawtooth waveforms. As shown in the figure, the positive sawtooth waveform, which has a higher negative-going duty cycle and produces a more diffuse plasma for a greater fraction of the discharge cycle, produces a greater thrust than the negative sawtooth waveform. The negative sawtooth waveform produces a more irregular plasma for a greater fraction of the discharge cycle and is less efficient in coupling momentum into the airflow for a comparable dissipated power. This result disproves the theory that the operation of the plasma actuator may be primarily attributable to the bulk heating of the air.

Figure 5F:
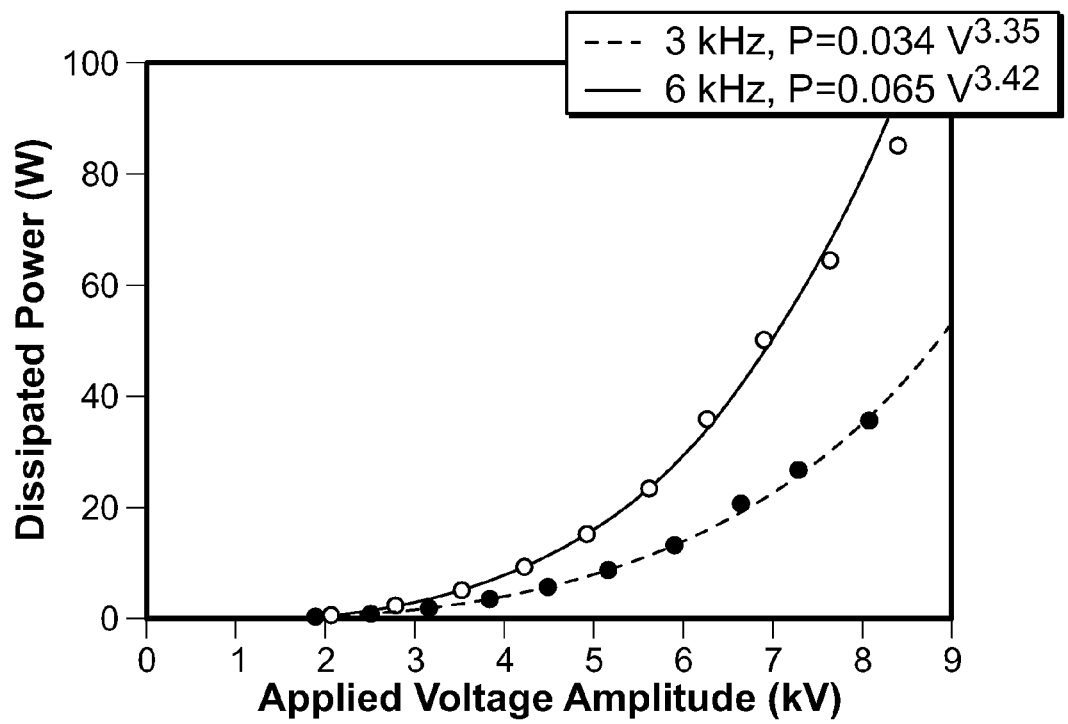
FIG. 5f is an illustration of power dissipated in the plasma generated by an example plasma actuator.

Referring now to FIG. 3, the power dissipation as a function of the amplitude of the applied voltage is consistent with the form and structure of the plasma and its discharge as discussed above. When the plasma ignites, effectively shorting out the capacitor C1, it forms part of a voltage divider. The impedance Z2 of the other element of the voltage divider, i.e. the capacitor C2, depends on the frequency of the applied waveform, $Z2=-i/\omega C2$. For a fixed frequency, the power dissipated would go as $V_{AC}^2$, if C2 is constant, wherein $V_{AC}$ is the applied voltage. Referring to FIG. 5f, the power dissipated in the plasma goes approximately as $V_{AC}^{7/2}$.

The results shown in FIG. 5f are consistent with one or both of two situations: (1) the average capacitance of the capacitor C2 increases with increasing applied voltage; and/or 2) the average resistance of the resistor R1 decreases with increasing applied voltage. As discussed above with respect to FIG. 2h, the higher the applied voltage, the faster the plasma discharge spreads along the surface of the dielectric 7. Therefore, the average area of the virtual electrode 13 increases with increasing applied voltage with a corresponding increase of the capacitance of the capacitor C2 in the model shown in FIG. 3.

Figure 5G:
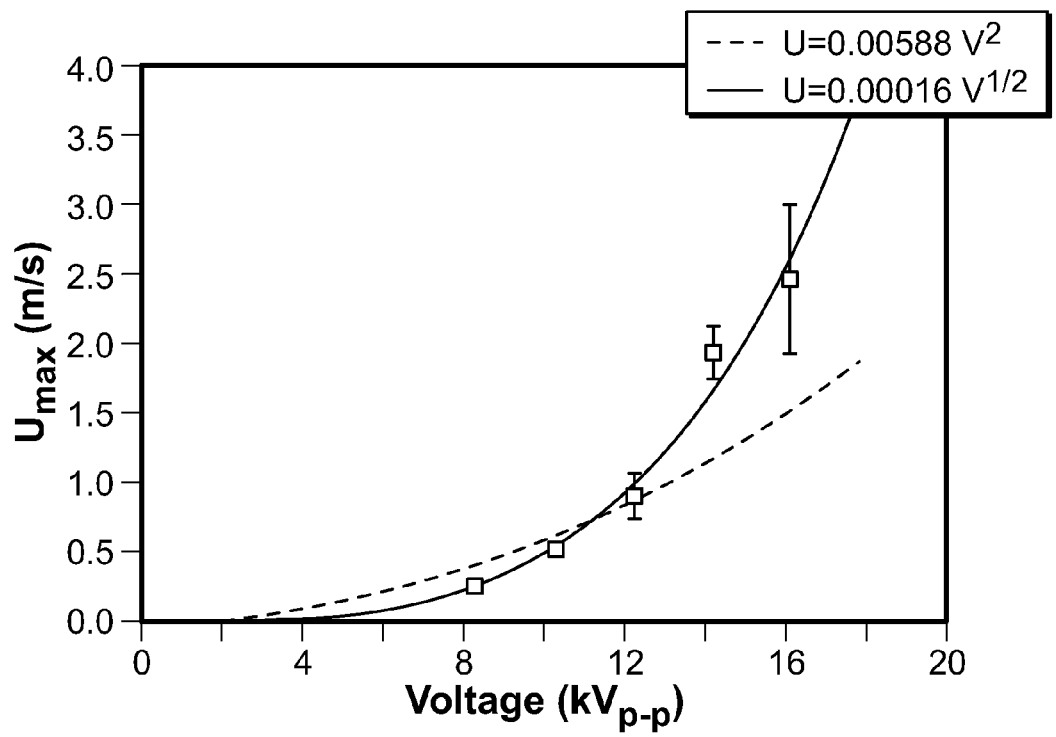
FIGS. 5g and 5h illustrate the induced velocity of air versus applied voltage for a square waveform and a triangle waveform, respectively when applied to an example plasma actuator.
Figure 5H:
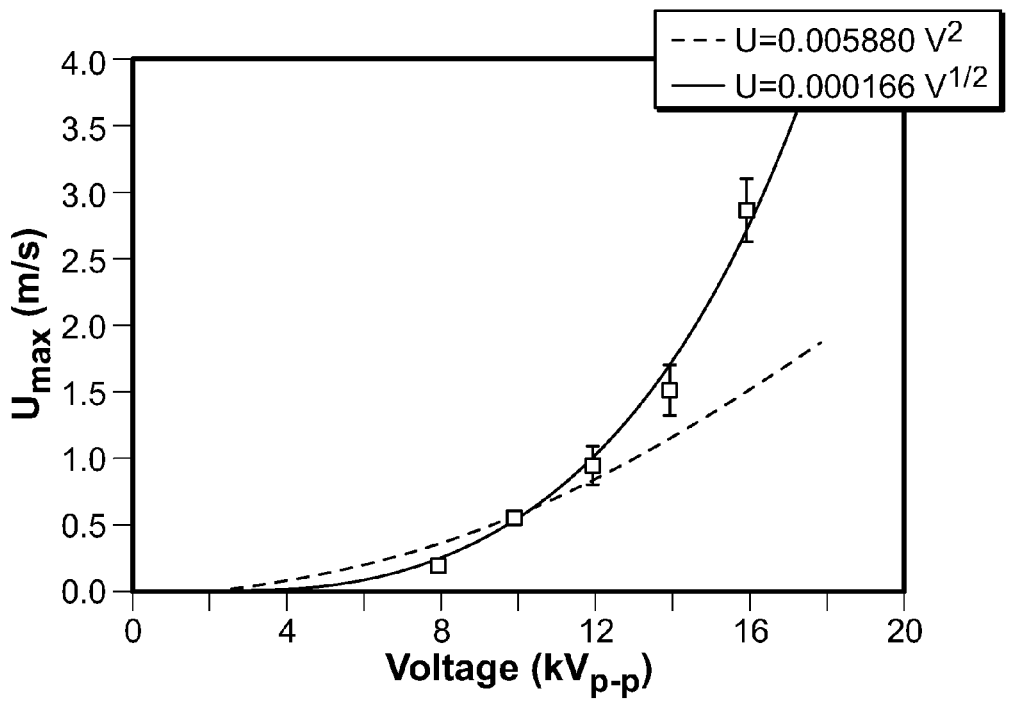

Referring to FIGS. 5g and 5h, particle image velocimetry (PIV) measurements of the velocity induced in the air by the plasma actuator 1, shows that the velocity imparted to the flow also goes approximately as $V_{AC}^{7/2}$. This result indicates a direct proportionality between the electrical power dissipated in the actuator and the velocity induced in the air. The efficiency of the momentum coupling may be controlled by interactions at the edge of the exposed electrode 5. FIG. 5g shows the induced velocity for a square waveform applied voltage and FIG. 5h shows the induced velocity for a triangle waveform applied voltage. The results shown in FIGS. 5g and 5h indicate that the proportionality of the induced voltage to $V_{AC}^{7/2}$ applies irrespective of waveform shape.

Figure 5I:
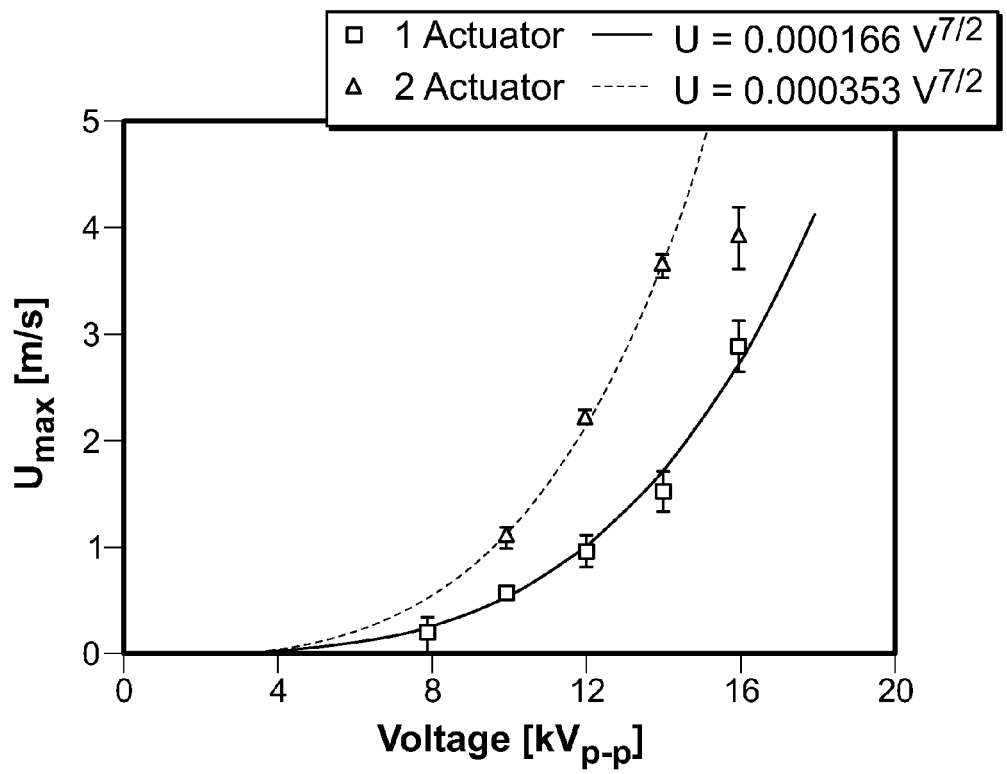
FIG. 5i illustrates the linear additive effect of an example plasma actuator.

As discussed above, the use of multiple actuators provides a linear additive effect, i.e. the velocity increase of multiple actuators is additive. Referring to FIG. 5i, for an applied voltage, two actuators placed one behind the other provides more than twice the velocity increase of a single actuator alone.

Figure 5J:
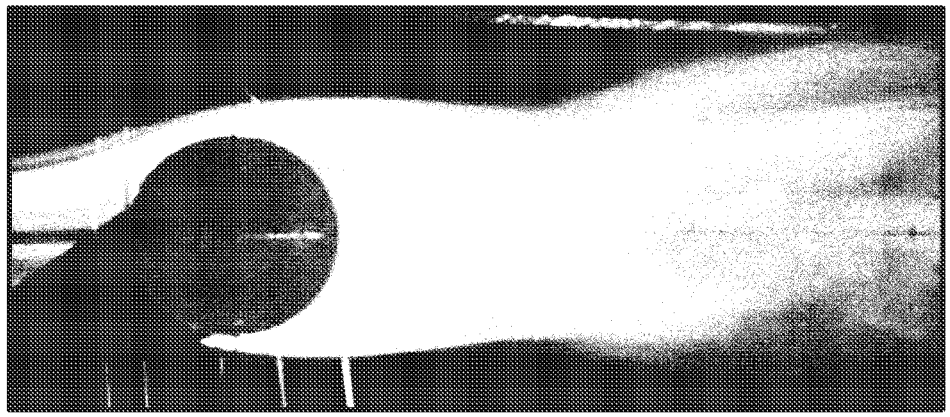
FIG. 5j is a smoke visualization of a cylinder showing the typical airflow around the cylinder.
Figure 5K:
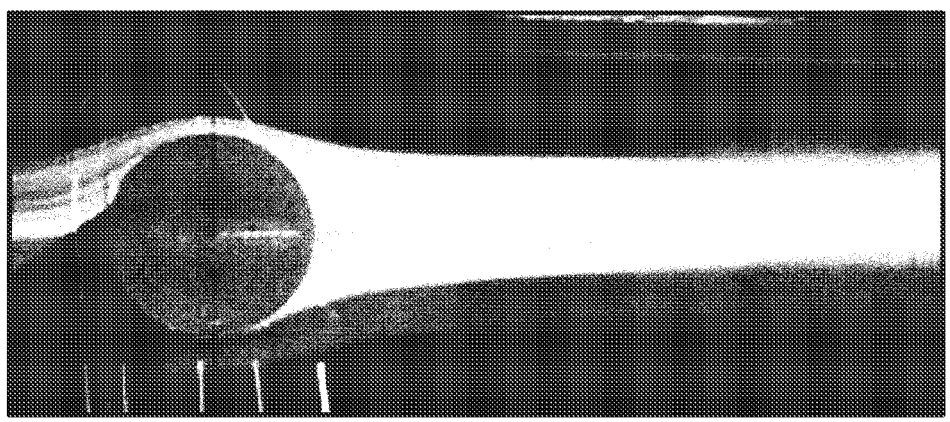
FIG. 5k is a smoke visualization of the cylinder of FIG. 5j, showing the energization of two example plasma actuators located on the diameter of the cylinder.

Airflow separation around a 5 inch diameter cylinder may be smoothed out as shown in FIGS. 5j and 5k using plasma actuators. This smoothing may reduce drag by approximately close to 90%. The present disclosure applies this principal to ground vehicles to reduce drag while increasing fuel mileage.

Figure 6A:
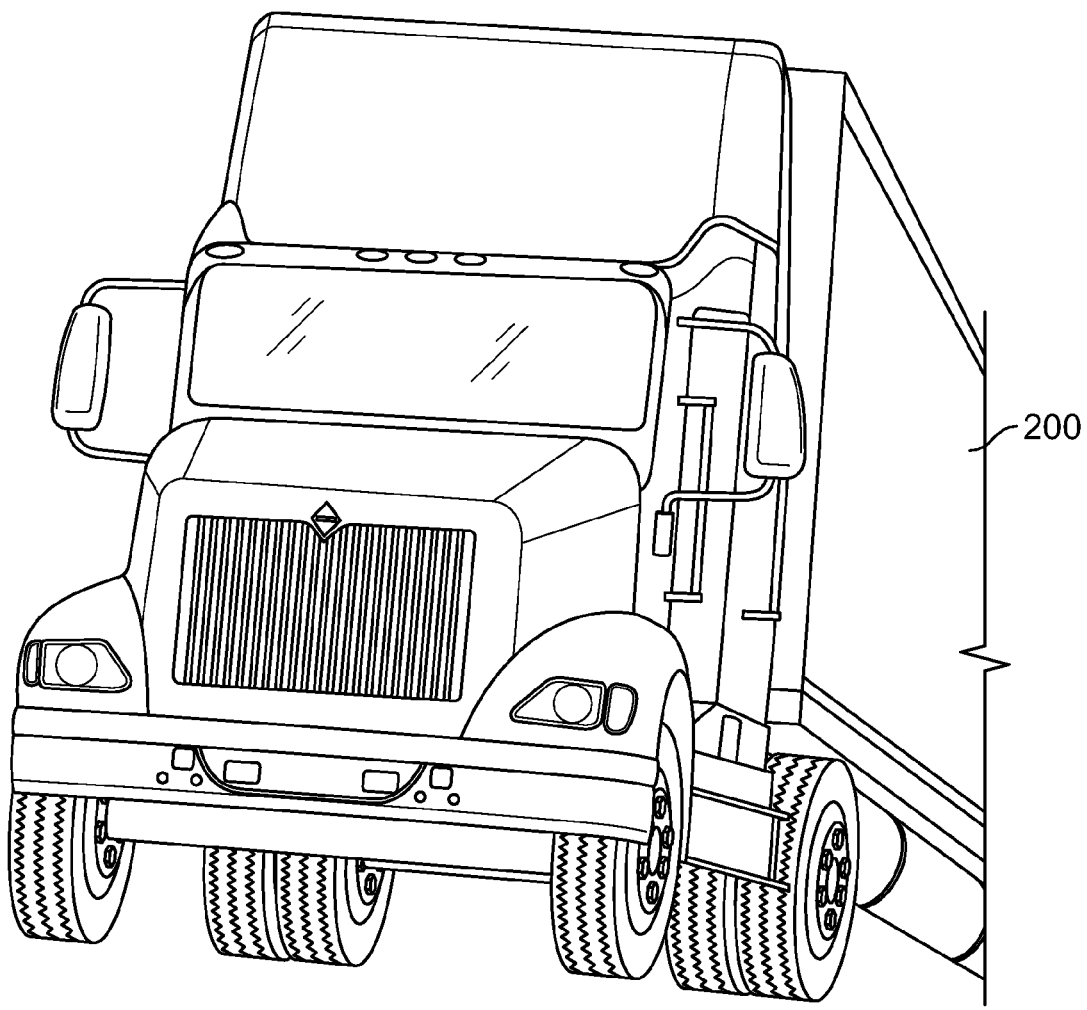
FIG. 6a illustrates an example class-8 truck for use with the example plasma actuator of FIG. 1.
Figure 6B:
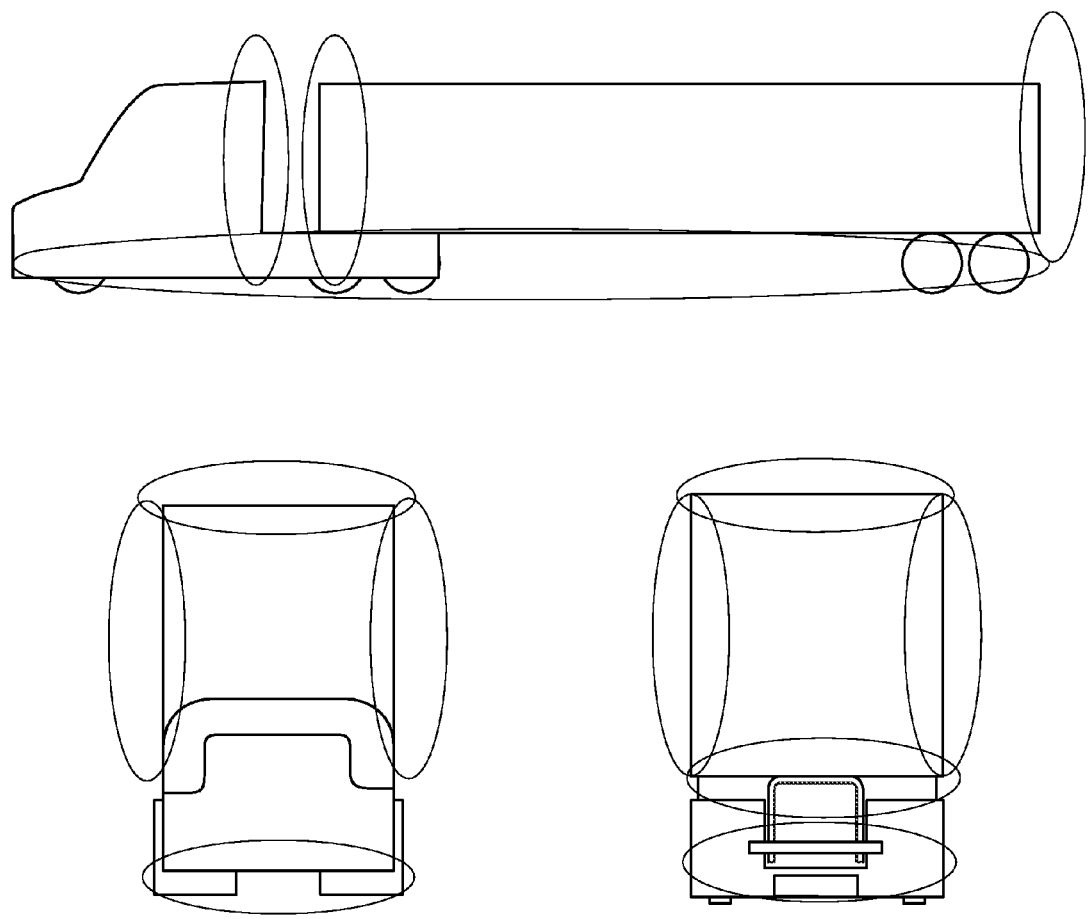
FIG. 6b illustrates where on the example tractor and trailer the example plasma actuator of FIG. 1 may effect drag.

In the disclosed example, the plasma actuator 1 may be used on a vehicle 200, such as for example, a Class-8, 18-wheel tractor-trailer rigs as shown in FIG. 6a. While the present disclosure describes the application of the plasma actuator 1 to a class-8 truck, it will be appreciated that the vehicle may be any suitable vehicle, such as for instance, a passenger car, bus, van, SUV, pick-up truck, high performance vehicle, or other similar vehicle. In this example, the vehicle 200 is a large, long range rig designed to deliver cargo over local and interstate highway systems and to provide rapid movement of goods where needed from cities, ports, locations of manufactured goods and wholesale distribution points. When conditions allow, these vehicles may cruise from 50 to 70 miles per hour (MPH) non-stop for long distances. For the past 25 years, while passenger cars and small trucks have typically obtained an increase in gasoline mileage, these example class-8 rigs have averaged between approximately 5.5 to 6.5 miles per gallon. As shown in FIGS. 6b and 6c, there are areas on these rigs where airflow separations and interferences result in significant drag penalties. Accordingly to some studies, on average two-thirds of the power required to cruise one of these rigs at 70 MPH is the result of overcoming aerodynamic drag. Therefore, a significant reduction in that drag could result in large reductions in fuel consumption.

Figure 7A:
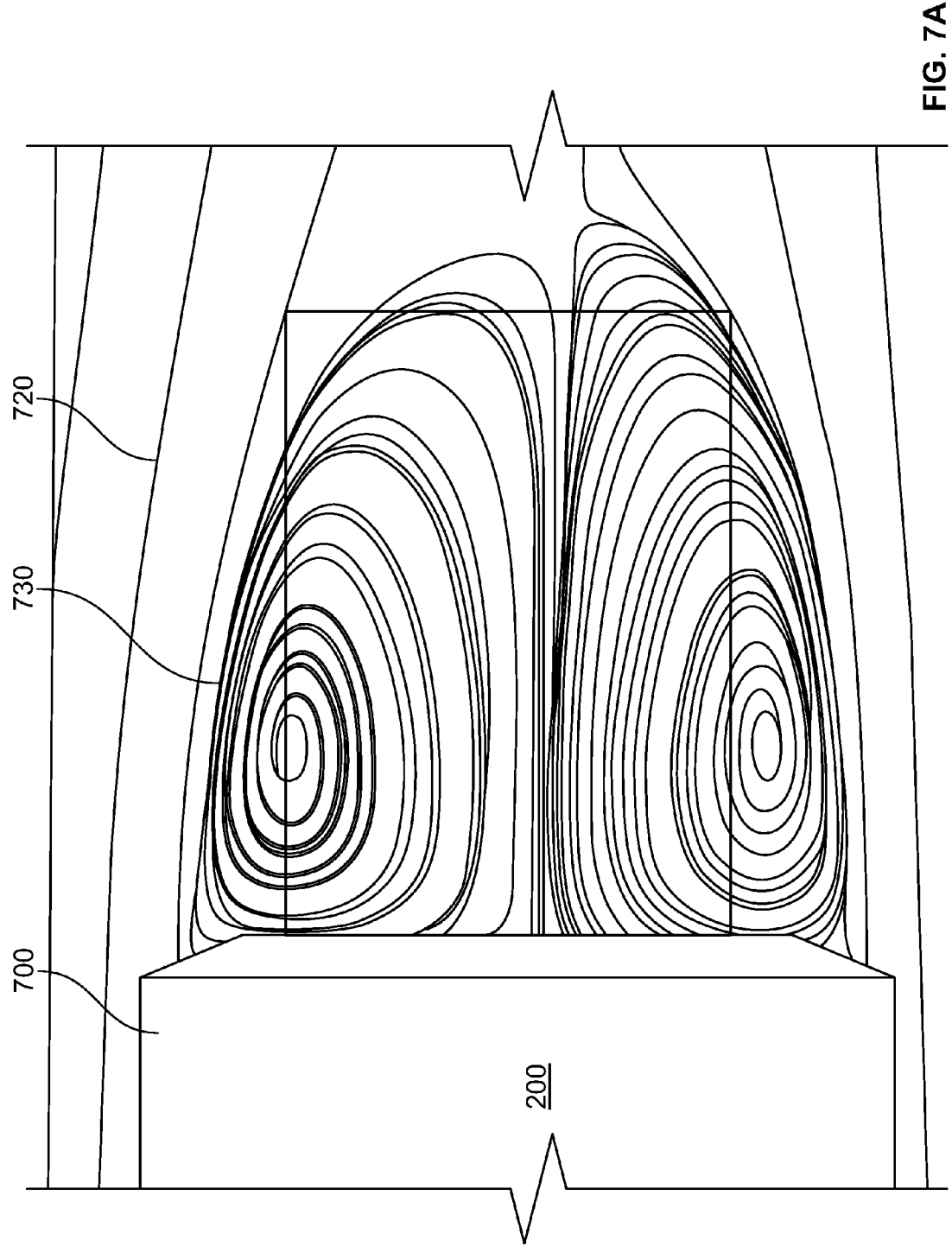
FIG. 7a illustrates an example of airflow behind a tractor or trailer while cruising at typical highway speeds.
Figure 7B:
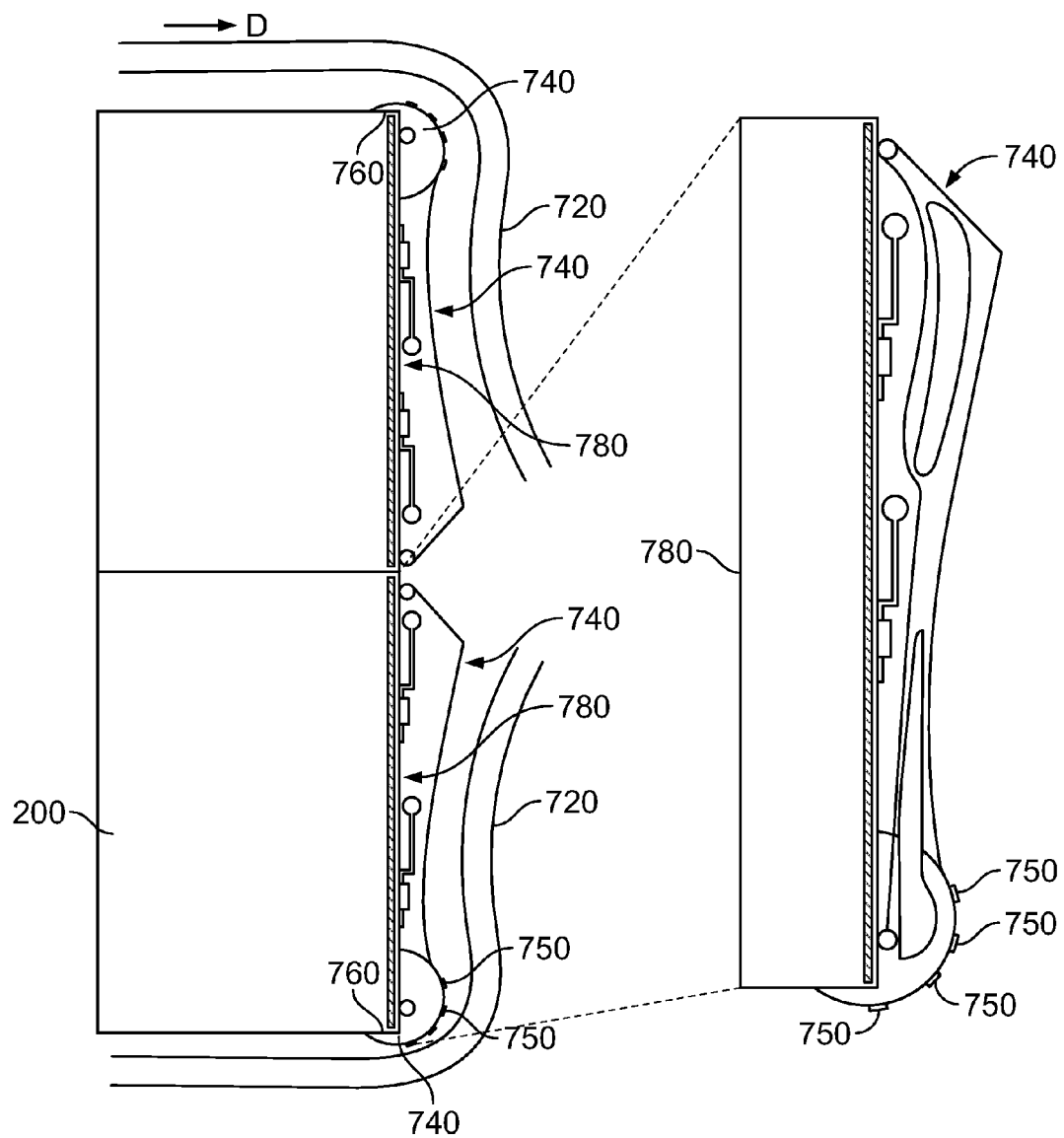
FIG. 7b illustrates an example configuration of plasma actuators mounted on a fairing attached to the back of the tractor or trailer.

FIG. 7a shows a plan view of an aft section 700 of the vehicle 200, (e.g. a class-8 trailer) as it is today with a typical airflow 720 depicted showing large separated areas on the back surface of the vehicle. In essence, the airflow 720 cannot make the sharp turn typical of the vehicle 200 and thus separates. This separation causes strong vortices 730 to form, which contribute significantly to the drag of the vehicle 200 (called base drag) and increases fuel consumption. A fairing 740 as shown in FIG. 7b with a plurality of plasma actuators 750 arrayed in various locations can cause the airflow 720 to adhere to the surface around a corner 760 and along a back surface 780 of the vehicle 200. In this example, the resulting airflow 720 is smoothed out reducing the wake, and increasing the pressure on the rear surface of the trailer. The aerodynamic performance of the vehicle 200 is thus improved which results in less drag, lower fuel consumption and a reduction in the strength of the wake behind the vehicle 200. In crosswinds the drag may be even greater, and design manipulation of the plasma actuator 750 may improve the handling of the vehicle 720 while showing improved fuel consumption.

In this example, the fairing 740 shown in FIG. 7b may be made from any suitable material and coupled to the vehicle 720 in such a way to open easily and move out of the way, allowing in the instance of a truck, rapid access to the trailer doors loading and unloading. For instance, the opened fairings 740 may lie alongside the sides of the vehicle 200 like the doors to allow close parking between vehicles 200 at, for example, loading docks or the like. The plasma actuators 750 may be bonded, adhered, laminated, or otherwise secured to the surface of the fairing 740 or recessed in the fairing 740 so that the exposed electrode 5 is flush with the aerodynamic surface of the fairing 740. The fairing 740 may be painted with suitable paint such as a non-metallic paint, to further protect the actuators 5,7 from debris or damage from rough handling. The arrangement of the plasma actuators 750 induces a velocity component in the downstream direction D to inhibit flow separation over the fairing 740. Each plasma actuator 750, in this example, is placed just prior to the location where the airflow 720 would naturally separate if the plasma actuators 750 were not present. In one example, during braking of the vehicle 200, when increased drag actuator 750 may be an advantage, the plasma may be turned off allowing separation of the airflow 720 to occur and drag to increase, thus helping to slow the vehicle.

Figure 8A:
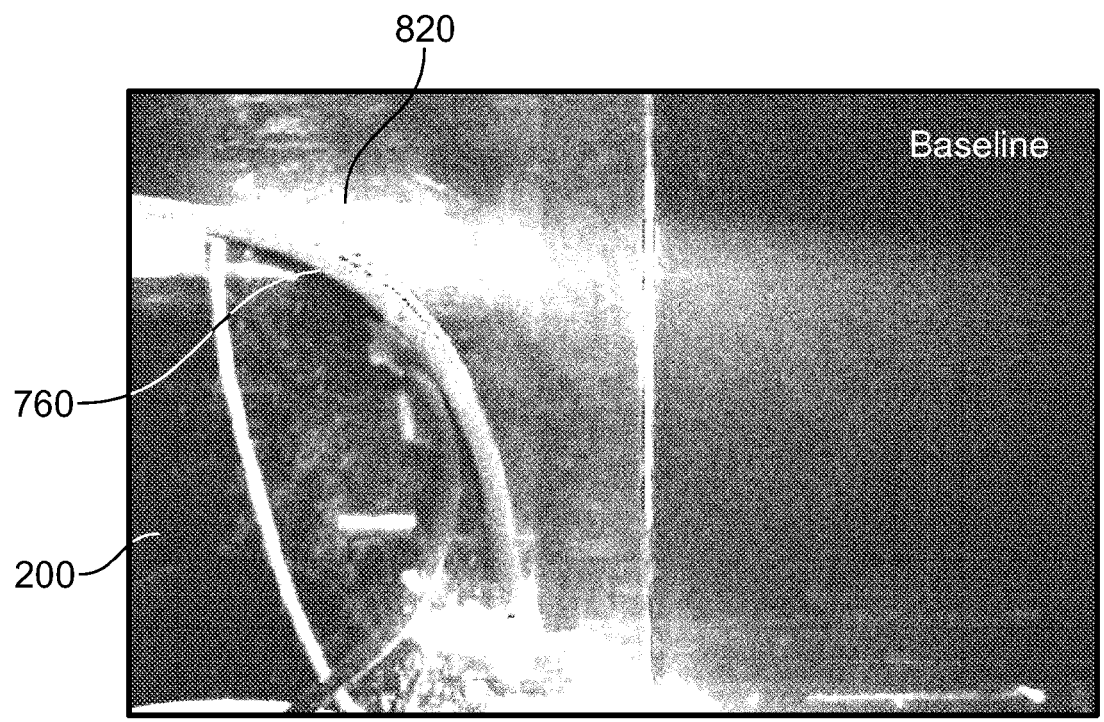
FIG. 8a is a smoke visualization of airflow around a four-inch radius surface in a wind tunnel without plasma actuators operating.
Figure 8B:
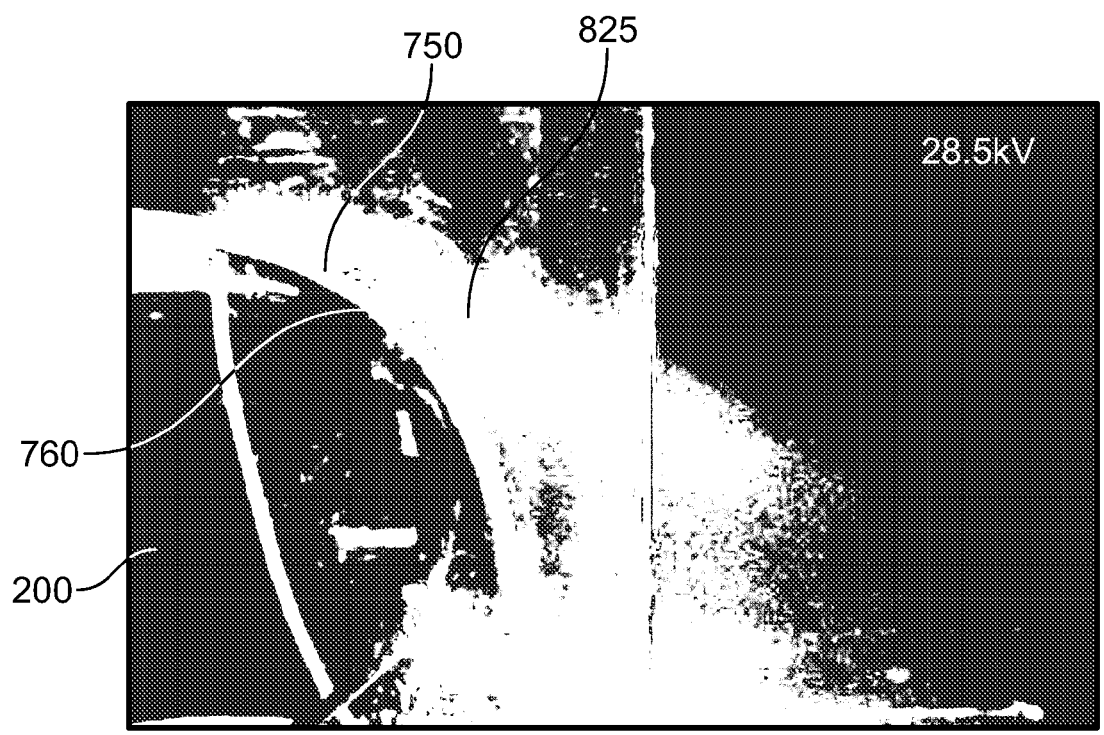
FIG. 8b is a smoke visualization of airflow around the four-inch radius surface of FIG. 8a with an example plasma actuator operating at a voltage of 28.5 kilovolts.
Figure 9:
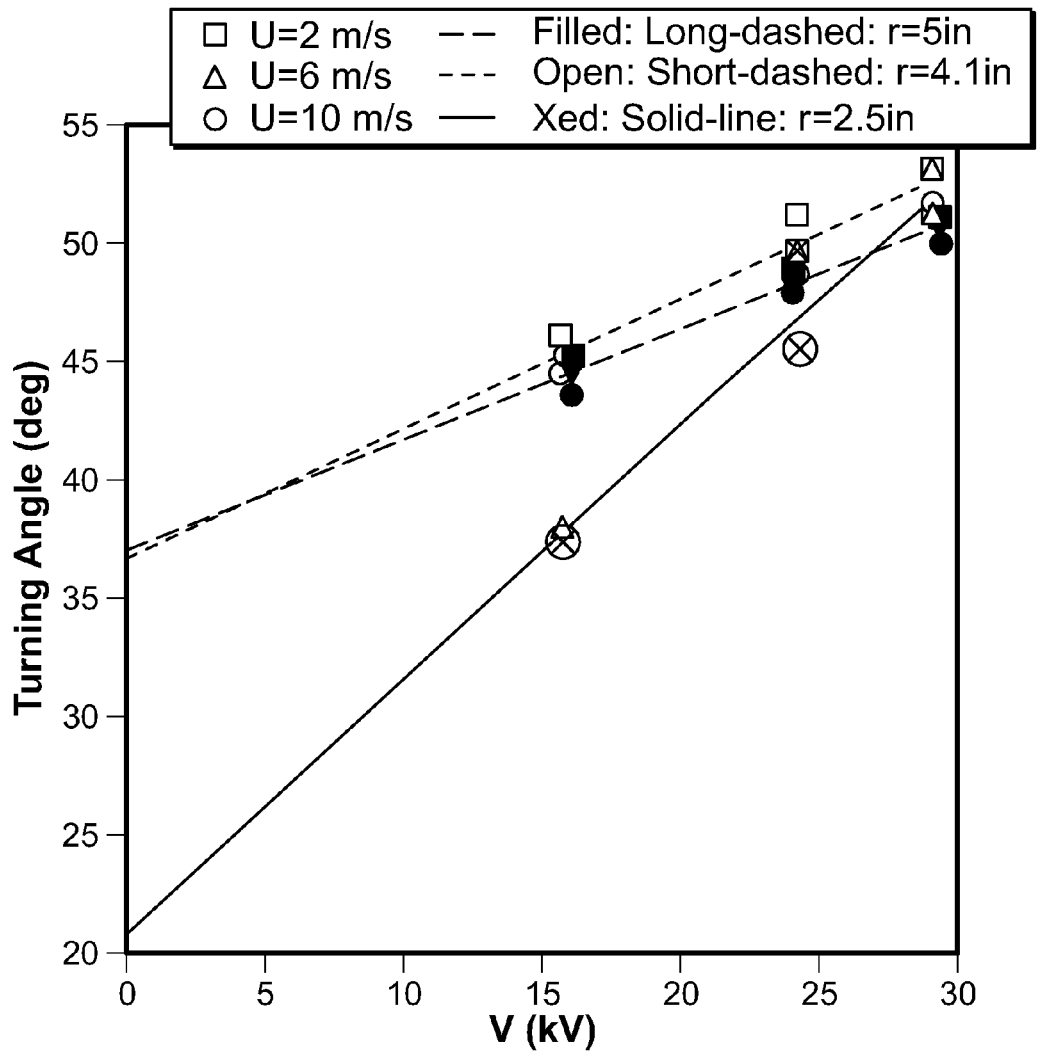
FIG. 9 illustrates results showing the separation angle of the airflow as a function of radius, velocity of the airflow, and voltage of the plasma actuator, in an example wind tunnel test.

The fairing 740 arrangement as tested in this example shows the effect of the plasma actuators 750 on the airflow 720. In one test, smoke is introduced into the airflow 720 to provide visualization of the airflow 720. A two-dimensional model of the vehicle 200 and the corner 760, shown in FIGS. 8a and 8b illustrates the impact of the plasma actuator 750 on the airflow 720. Specifically, FIG. 8a shows a radius airflow 820 with no active plasma actuator 750. FIG. 8b shows an airflow 825 with the plasma actuator 750 operating at 28.7 kV. Data collected and graphed at FIG. 9 shows that with one plasma actuator 750, the flow separation point moved from approximately 37 to approximately 53 degrees around the 4.1 inch radius corner 760. With a 2.5 inch radius corner (not shown) the flow separation moved from approximately 21 to approximately 52 degrees with one plasma actuator 750, an increase in flow attachment of approximately 31 degrees. It will be appreciated that with multiple actuators 750, major flow changes may be expected, reducing the momentum drag and enhancing the fuel efficiency of the vehicle 200.

FIG. 9 shows the results of the early testing using all three different radii in a wind tunnel. The data indicate that the separation angle is little affected by velocity, but greatly affected by the radius of the corner 760 and the voltage as applied to the plasma actuator 750 stated above. Additionally, the separation angle is more sensitive to voltage as the radius decreases. Significant delay in the separation angle can be seen at the higher voltages. Pressure data taken in the wake of the model showed significant reduction in momentum drag at the higher separation angles. This data demonstrates that plasma flow control can reduce the drag of the vehicle 200.

Other locations on the vehicle 200 also show separation which contributes to drag. In the example of a class-8 truck, the gap between the tractor and the trailer contributes a considerable percentage of the overall drag. The Department of Energy suggests it is also about one-third of the total. The use of plasma actuator to reduce drag of the rear of the example vehicle 200 may be applied to the gap of the vehicle as well. For example, in a class-8 truck, the airflow hitting the front of the trailer may be directed such that treatment at the trailer with fairings and plasma actuators would clean up the airflow and reduce the drag of the gap considerably. In this instance, the front of the trailer may be treated with a fairing and/or plasma actuator to cause the airflow to remain attached along the trailer sides, thus providing drag reduction. Still other areas under the vehicle 200 and around the sides may benefit from the use of plasma actuators to further reduce drag and reduce side forces caused by crosswinds, to reduce power, and to provide some control power relief for vehicles in high winds.

Although certain example methods and apparatus have been described herein, the scope of coverage of this patent is not limited thereto. On the contrary, this patent covers all methods, apparatus and articles of manufacture fairly falling within the scope of the appended claims either literally or under the doctrine of equivalents.

We claim:

1. A drag reducing apparatus for a ground vehicle comprising:
    at least one plasma generating device configured to be coupled to a trailing edge of the ground vehicle, wherein the trailing edge of the ground vehicle includes a surface having a first substantially planer portion separated from a second substantially planer portion by a corner, and wherein the surface is subjected to a fluid flow when the ground vehicle is in motion, the plasma generating device comprising:
    a dielectric,
    a first electrode exposed to the fluid flow,
    a second electrode separated from the fluid flow by the dielectric, and
    a power supply electrically coupled to the first and second electrodes such that energization of the power supply causes the at least one plasma generating device to generate a plasma between the first and second electrodes,
    the plasma inducing a velocity component in a downstream direction of the fluid flow, to move a separation point of the fluid flow along the corner towards the second portion, thus reducing a drag force generated by the fluid flow over the surface of the ground vehicle.

2. A drag reducing apparatus as defined in claim 1, wherein the at least one plasma generating device is a single dielectric barrier discharge plasma actuator.

3. A drag reducing apparatus as defined in claim 1, wherein the power supply is an alternating current device.

4. A drag reducing apparatus as defined in claim 1, wherein the dielectric comprises a minimally conductive material.

5. A drag reducing apparatus as defined in claim 1, wherein the first and second electrodes comprise a conductive material.

6. A drag reducing apparatus as defined in claim 1, further comprising a fairing coupled to or integrated into the surface of the vehicle, and wherein the at least one plasma generating device is coupled to a surface of the fairing, and wherein the surface of the fairing is subjected to a fluid flow.

7. A drag reducing apparatus as defined in claim 1, wherein the ground vehicle is a truck comprising a truck rig, and a truck trailer.

8. A drag reducing apparatus as defined in claim 7, wherein the at least one plasma generating device is coupled to a trailing edge of the truck rig.

9. A drag reducing apparatus as defined in claim 1, wherein the plasma generating device is adopted to reduce the separation of the fluid flow over the surface of the vehicle.

10. A method of reducing drag generated by a ground vehicle comprising:

coupling at least one plasma generating device to a trailing edge of an outer surface of the ground vehicle, the surface comprising a first substantially planer surface portion and a second substantially planer surface portion separated from the first surface portion by a corner, the plasma generating device comprising:
- a dielectric,
- a first electrode exposed to the fluid flow, and
- a second electrode enclosed by the dielectric;

coupling a power supply to the first and second electrodes;

energizing the first and second electrodes to produce a plasma when the body is subjected to a fluid flow;

inducing a velocity component in a downstream direction of the fluid flow with the produced plasma; and moving a separation point of the fluid flow over the corner towards the second surface of the outer surface of the ground vehicle.

11. A method as defined in claim 10, wherein the at least one plasma generating device is a single dielectric barrier discharge plasma actuator.

12. A method as defined in claim 10, further comprising selectively deenergizing the at least one plasma generating device when the ground vehicle is subjected to the fluid flow.

13. A method as defined in claim 10, wherein the ground vehicle is at least one of a truck, a passenger car, a bus, a van, a sport utility vehicle, a pick-up truck, a high performance vehicle, or other similar ground vehicle.

14. A method as defined in claim 10, further comprising coupling at least one array of plasma generating devices to at least a portion of the outer surface of the vehicle.

15. A drag reducing apparatus as defined in claim 1, wherein the corner is ninety degrees such that the first surface portion is orthogonal to the second surface portion.

16. A drag reducing apparatus as defined in claim 1, wherein the at least one plasma generating device is coupled to a fairing mounted to the ground vehicle.

17. A drag reducing apparatus as defined in claim 16, wherein the fairing is permanently mounted to the ground vehicle.

18. A drag reducing apparatus as defined in claim 1, wherein the plasma generating device is adapted to create a plasma at a downstream edge of the first surface portion and an upstream edge of the corner.

19. A drag reducing apparatus comprising:
- a ground vehicle having an leading edge and a trailing edge, the trailing edge including a substantially planer downstream surface out of plane with a substantially planer upstream surface and a corner coupling the upstream and downstream surfaces, and wherein the ground vehicle is subject to a fluid flow
- at least one plasma generating device coupled to the trailing edge of the ground vehicle, the plasma generating device comprising:
  - a dielectric,
  - a first electrode exposed to the fluid flow, and
  - a second electrode enclosed by the dielectric;
- a power supply electrically coupled to the first and second electrodes such that energization of the power supply causes the at least one plasma generating device to generate a plasma between the first and second electrodes,
- the plasma inducing a flow in a downstream direction of the fluid flow, and moving a separation point of the fluid flow over the corner towards the downstream surface, thus reducing a drag force generated by the fluid flow over the ground vehicle.

20. A drag reducing apparatus as defined in claim 19, wherein the downstream surface is ninety degrees out of plane of the upstream surface.

21. A drag reducing apparatus as defined in claim 19, wherein moving the separation point of the fluid flow increases the pressure on the downstream surface.

* * * * *